United States Patent
Tan et al.

(10) Patent No.: US 7,671,946 B2
(45) Date of Patent: Mar. 2, 2010

(54) ELECTRONICALLY COMPENSATED LCD ASSEMBLY

(75) Inventors: Kim Leong Tan, Santa Rosa, CA (US); Andrew Thomas Taylor, Santa Rosa, CA (US); Apurba Pradhan, San Francisco, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 686 days.

(21) Appl. No.: 11/550,041

(22) Filed: Oct. 17, 2006

(65) Prior Publication Data
US 2007/0085972 A1   Apr. 19, 2007

Related U.S. Application Data

(60) Provisional application No. 60/727,969, filed on Oct. 18, 2005.

(51) Int. Cl.
*G02F 1/1335* (2006.01)
*G03B 21/14* (2006.01)

(52) U.S. Cl. .............................. 349/117; 353/20; 349/96

(58) Field of Classification Search ........................ None
See application file for complete search history.

(56) References Cited

U.S. PATENT DOCUMENTS

| | | | | |
|---|---|---|---|---|
| 2,478,385 A | 8/1949 | Gaiser | .......................... | 359/580 |
| 3,185,020 A | 5/1965 | Thelen | .......................... | 359/586 |
| 3,463,574 A | 8/1969 | Bastien et al. | .............. | 359/588 |
| 3,565,509 A | 2/1971 | Sulzbach | ..................... | 359/588 |
| 3,604,784 A | 9/1971 | Louderback et al. | ......... | 350/164 |
| 3,781,090 A | 12/1973 | Sumita | ........................ | 350/164 |
| 3,799,653 A | 3/1974 | Ikeda | ........................... | 350/164 |
| 3,822,926 A | 7/1974 | Dalbera et al. | ............... | 359/586 |
| 3,936,136 A | 2/1976 | Ikeda et al. | ..................... | 350/1 |
| 4,313,647 A | 2/1982 | Takazawa | ..................... | 350/164 |
| 4,666,250 A | 5/1987 | Southwell et al. | ............ | 359/586 |
| 4,889,412 A | 12/1989 | Clerc et al. | ................... | 350/347 |
| 5,142,393 A | 8/1992 | Okumura et al. | ............. | 349/121 |

(Continued)

FOREIGN PATENT DOCUMENTS

EP     0621499     10/1994

(Continued)

OTHER PUBLICATIONS

U.S. Appl. No. 11/419,872, filed May 23, 2006, Tan et al.

(Continued)

*Primary Examiner*—Tina M Wong
(74) *Attorney, Agent, or Firm*—Matthew A. Pequignot; Pequignot + Myers LLC

(57) ABSTRACT

The invention relates to a method of electronic contrast enhancement for an LCD panel for use in an imaging device. The method comprises the step of coupling the LCD panel with a trim retarder in a pre-determined azimuthal orientation for at least partially compensating the residual in-plane retardance, followed by the step of non-mechanical fine-tuning of a dark state of the LCD panel. In the preferred embodiment, the fine-tuning of the dark state of the LCD panel is realized by adjusting the dark-state magnitude of the LC voltage. The method can be used in batch, e.g. wafer-level manufacturing of integrated trim retarder/LCD panels assemblies that can be electronically tuned to provide high on/off contrast.

20 Claims, 25 Drawing Sheets

U.S. PATENT DOCUMENTS

| | | | |
|---|---|---|---|
| 5,184,237 A | 2/1993 | Iimura et al. | 349/119 |
| 5,196,953 A | 3/1993 | Yeh et al. | 349/119 |
| 5,220,447 A | 6/1993 | Yokokura et al. | 349/119 |
| 5,375,006 A | 12/1994 | Haas et al. | 359/73 |
| 5,490,006 A | 2/1996 | Masumoto et al. | 349/117 |
| 5,508,830 A * | 4/1996 | Imoto et al. | 349/5 |
| 5,619,352 A | 4/1997 | Koch et al. | 349/89 |
| 5,688,566 A | 11/1997 | Broer et al. | 428/1.31 |
| 5,777,709 A | 7/1998 | Xu | 349/120 |
| 5,798,808 A | 8/1998 | Van Haaren et al. | 349/96 |
| 5,895,106 A | 4/1999 | VanderPloeg et al. | 349/120 |
| 5,986,733 A | 11/1999 | Winker et al. | 349/120 |
| 6,057,901 A | 5/2000 | Xu | 349/121 |
| 6,141,075 A | 10/2000 | Ohmuro et al. | 349/130 |
| 6,175,400 B1 | 1/2001 | Duncan et al. | 349/117 |
| 6,280,036 B1 | 8/2001 | Suzuki | 353/31 |
| 6,350,033 B1 | 2/2002 | Fujimori | 353/61 |
| 6,356,325 B1 | 3/2002 | Shimoshikiryo | 349/121 |
| 6,394,608 B1 | 5/2002 | Shiraishi et al. | 353/57 |
| 6,556,266 B1 | 4/2003 | Shirochi et al. | 349/118 |
| 6,585,378 B2 | 7/2003 | Kurtz et al. | 353/31 |
| 6,587,171 B1 | 7/2003 | Georges et al. | 349/120 |
| 6,805,445 B2 | 10/2004 | Silverstein et al. | 353/20 |
| 6,805,924 B1 | 10/2004 | Ishikawa et al. | 428/1.1 |
| 6,857,747 B2 | 2/2005 | Pentico et al. | 353/31 |
| 6,867,834 B1 | 3/2005 | Coates et al. | 349/119 |
| 6,885,422 B2 | 4/2005 | Suzuki et al. | 349/121 |
| 6,909,473 B2 | 6/2005 | Mi et al. | 349/5 |
| 6,912,030 B1 | 6/2005 | Coates et al. | 349/119 |
| 7,079,209 B2 | 7/2006 | Nakagawa | 349/119 |
| 7,345,723 B2 * | 3/2008 | Robinson et al. | 349/117 |
| 2002/0033992 A1 | 3/2002 | Den Bossche et al. | 359/292 |
| 2002/0047968 A1 | 4/2002 | Yoshida et al. | 349/117 |
| 2004/0070562 A1 | 4/2004 | Hudson et al. | 345/101 |
| 2004/0114079 A1 | 6/2004 | Kurtz et al. | 349/117 |
| 2004/0125090 A1 | 7/2004 | Hudson | 345/204 |
| 2005/0122482 A1 | 6/2005 | Ellis et al. | 353/61 |
| 2005/0128380 A1 | 6/2005 | Zieba et al. | 349/96 |
| 2005/0128391 A1 | 6/2005 | Tan et al. | 349/117 |
| 2006/0215091 A1 | 9/2006 | Muramoto et al. | 349/117 |

FOREIGN PATENT DOCUMENTS

| | | |
|---|---|---|
| WO | WO2004/104680 | * 12/2004 |

OTHER PUBLICATIONS

X.J. Yu et al., "Optical wire-grid polarizers at oblique angles of incidence," J. Appl. Phys. 93(8), Apr. 15, 2003, pp. 4407-4412.

S-Y. Lu and R. Chipman, "Interpretation of Mueller matrices based on polar decomposition," J. Opt. Soc. Am., 13, pp. 1106-1113, 1996.

J. E. Anderson et al. "Fast VAN LCoS Microdisplay," SID 05 Digest, pp. 1366-1369, 2005.

S. Hashimoto et al. "SXRD (Silicon X-tal Reflective Display): A new display device for projection displays," SID 05 Digest, pp. 1362-1365, 2005.

Sergan et al. "Measurement and modeling of optical performance of wire grids and liquid-crystal displays utilizing grid polarizers," J. Opt. Soc. Am. A, 19(9), p. 1872, 2002.

J. Chen, M.G. Robinson, D.A. Coleman, and G.D. Sharp, "Impact of the Orientation of Panel Pretilt Directional and Quarter-wave Plate on LCoS Projection System Contrast," SID 06, Digest, pp. 1606-1609, 2006.

J. Chen, "Impact of the Orientation of Panel Pretilt Direction and Quarter Wave Plate on LCOS Projection System Contrast", Boulder, Colorado, pp. 1-5.

Ramamurthy et al, "Determining Contrast Sensitivity Functions for Monochromatic Light Emitted by High Brightness LED's", Third International Conf. In Solid State Lighting 2004; Proceedings of SPIE 5187, pp. 294-300.

C. Pentico, M. Newell and M. Greenberg, "Ultra High Contrast Color Management System For Projection Displays," SID 03 Digest, pp. 130-133, 2003.

D. Hansen, E. Gardner, R. Perkins, M. Lines, and A. Robbins, "The Display Applications And Physics Of The Proflux Wire Grid Polarizer," SID 02 Digest, p. 730, 2002.

D. Anderson and K. Shahzad, "Off-Axis LCos Compensation For Enhanced Contrast," SID 03 Digest, pp. 1433-1435, 2003.

J. Chen, M.G. Robinson and G.D. Sharp, "General Methodology For LCos Panel Compensation," SID 04, Digest, pp. 990-993, 2004.

K. Tan et al., "Design And Characterization Of A Compensator For High Contrast LCos Projection Systems," SID'05, May 22-27, 2005, Paper 64.2.

H. Mori, et al., "Novel Optical Compensation Method Based Upon A Discotic Optical Compensation Film For Wide-Viewing-Angle LCDs," SID 03 Digest, p. 1058, 2003.

M. Duelli et al., "High Performance Contrast Enhancing Films for VAN-Mode LCoS Panels," SID 05 Digest, p. 892, 2005.

H. Seiberle, K. Schmitt and M. Schadt, "Multidomain LCDs and Complex Optical Retarders Generated by Photo-alignment," Proc. Eurodisplays '99, pp. 6-9, Sep. 1999.

"Birefringent Compensators for Normally White TN-LCD's", Eblen J.P. et al, Society for Information Display, SID International Papers, San Jose, Jun. 14-16, 1994; Santa Ana SID, U.S. vol. 25, Jun. 14, 1994, pp. 245-248, XP000462707, Chapter, Design.

J. E. Anderson et al. "Fast VAN LcoS Microdisplay," SID 05 Digest, pp. 1366-1369, 2005.

"Achromatic phase retarder by slanted illumincation of a dielectric grating with period comparable with the wavelength", Bokor et al, Applied Optics, vol. 40, No. 13, May 1, 2001; pp. 2076-2080.

"Mechanism of shape formation of three-dimensional periodic nanostructures by bias sputtering", Kawakami et al, Applied Physics Ltrs, vol. 74, No. 8, Jan. 18, 1999, pp. 463-465.

"Photonic crystals for the visible range fabricated by autocloning technique and their application", Sato et al, Optical and Quantum Electronics 34: pp. 63-70.

* cited by examiner

ELECTRONICALLY COMPENSATED LCD ASSEMBLY

CROSS-REFERENCE TO RELATED APPLICATIONS

The present invention claims priority from U.S. Provisional Patent Application No. 60/727,969 filed Oct. 18, 2005, entitled "Electronically Compensated LCD Assembly", which is incorporated herein by reference. This application is related to U.S. patent application Ser. No. 11/009,476 filed on Dec. 10, 2004, Ser. No. 11/358,605 filed Feb. 21, 2006, Ser. No. 11/419,872 filed May 23, 2006, and Ser. No. 11/468,860 filed Aug. 31, 2006, all of which are incorporated herein by reference.

MICROFICHE APPENDIX

Not Applicable.

TECHNICAL FIELD

The present invention relates generally to polarization compensation for projection displays, and in particular, to an electronically-tuned LCD assembly incorporating an LCD panel and a trim retarder, and to a method for electronic tuning of said LCD assembly for improving contrast.

BACKGROUND OF THE INVENTION

Liquid-crystal displays (LCDs) are commonly used in projection displays for large screen televisions and monitors. In these LCD-based projection systems, a high power beam of light is passed through a polarizer before being incident on a LCD panel. The LCD panel controls the polarization of the incident light pixel-by-pixel and redirects it towards the corresponding polarizer/analyzer, which then redirects light having the proper polarization to a projection lens that projects an image onto a screen.

One particularly successful LCD-based projection system is a WGP-based LCoS microdisplay system, which uses both wire grid polarizers (WGPs) and liquid crystal on silicon (LCoS) panels. This microdisplay system, which has been proven to exhibit both high resolution and high image contrast when compared to other microdisplay technologies such as transmissive liquid crystal (xLCD), digital light processor (DLP), and direct-view LCD, typically uses three or more microdisplay panels (e.g., one for each primary color band) to improve on-screen brightness.

Referring to FIG. 1, a conventional 3-panel WGP-based LCoS microdisplay system is shown. The microdisplay system includes a light source 5, which for example is a high-pressure discharge lamp, and a light rod 7. The light rod 7 homogenizes the cone of light produced by the light source 5 to ensure a spatially uniform light distribution. Optionally, the light rod 7 is a polarization conversion light pipe (PCLP) for producing linearly polarized light. A first lens 8a passes the light from the light pipe 7 to a first folding mirror 9, which directs the light to a first dichroic filter 10. The dichroic filter 10 separates out the blue light from the remaining light, and directs the blue light via second 8b and third 8c lenses, and second 17 and third 16 folding mirrors to a first LCoS display panel 20a. The remaining light, which is transmitted through the dichroic filter 10, is directed via fourth and fifth lenses 8d and 8e and a fourth folding mirror 11 to a second dichroic filter 12. The second dichroic filter 12 separates the remaining light into green and red light, the former of which is directed to a second LCoS display panel 20b and the latter of which passes to a third LCoS display panel 20c.

Prior to reaching each LCoS display panel 20a, 20b, and 20c, the incident light first passes through a WGP 15, 14, and 13 and a trim retarder compensator 21a, 21b, and 21c, respectively. Each WGP 15, 14, and 13 is a polarizer/analyser formed from a plurality of parallel micro-wires that transmits light having a polarization orthogonal to the direction of the parallel micro-wires and reflects light having a polarization parallel to the direction of the wires; e.g., if the polarizers are designed to pass horizontal or P-polarized light, as illustrated in FIG. 1, the micro-wires will be perpendicular to the plane of FIG. 1. Each LCoS panel 20a, 20b, and 20c alters the polarization of the linearly polarized incident light pixel-by-pixel and reflects the modulated light back to the corresponding WGP 15, 14, and 13. Since each WGP 15, 14, and 13 is orientated at approximately ±45° with respect to the principal direction of light propagation, in addition to serving as a polarizer/analyzer, each WGP 15, 13 and 14 also serves as a beamsplitter for separating the incoming light from the outgoing light by steering or deflecting the light reflected from the each LCoS panel along an output optical path orthogonal to the incoming optical path. More specifically, each WGP 15, 14, and 13 reflects S-polarized light, e.g., polarized light rotated by 90° by pixels in an ON state, to the X-cube 19. The X-cube 19 aggregates the images from each of the three color channels and, via the projection lens 18, projects the final image onto a large screen (not shown). Optionally, each color channel further includes a pre-polarizer (not shown) and/or a clean-up analyzer (not shown), which for example, may include one or more WGPs and/or dichroic sheet polarizers.

The reflective LCoS panels 20a, 20b, and 20c, hereinafter generally referred to as LCoS panels 20, may be either twisted nematic, e.g. 45.degree. twist (45TN), or vertically-aligned nematic (VAN-mode) panels, which get switched (or relaxed) to near homeotropic orientation. Other LC-modes in reflective LCOS and transmissive xLCD, i.e. bend-aligned nematic or pi-cell, also require trim retarders, if the LC-technology employs a dark-state director orientation near the homeotropic alignment. A VAN-mode cell on a reflective substrate is functionally equivalent to a pi-cell in transmission mode, i.e. both operate as electrically controllable birefringence for gray-scale with viewing angle symmetry about an axis orthogonal to the LC tilt-plane.

In homeotropic alignment the LC uniaxial positive molecules are oriented normal to the device plane. The dark, or OFF state may be a switched, or voltage-driven state or a relaxed state where no or little voltage is applied, depending on LC modes. In most applications, a true homeotropic orientation in the dark state is not suitable, i.e. a pre-tilt is required to provide consistent and faster switching behavior. Moreover, true homeotropic orientation in the dark state may not be available due to a lack of high voltage supplies in 45TN panels wherein the dark state requires the application of the electric field to the LC film, or due to boundary LC layers being anchored by alignment surface effects. As a consequence, the display panels in the dark state exhibit both an in-plane and an out-of-plane residual retardation component, i.e. A-plate and C-plate components, respectively. Due to the use of positive-only uniaxial LC in LCD panels, the c-plate component is always positive, thereby adding to the net panel retardance at off-axis illumination.

The trim retarder compensators 21a, 21b, and 21c, hereinafter simply referred to as trim retarders (TR) 21, are compensating elements used to improve the contrast performance level of the microdisplay system, which is otherwise limited by the residual birefringence of the LCoS panels in the dark, e.g., off state. In particular, each trim retarder 21 introduces a phase retardance that cancels the retardance resulting from the inherent birefringence of the corresponding LCoS panel. The term 'retardance' or 'retardation', as used herein, refers to linear retardance magnitude as opposed to circular retardance magnitude, unless stated otherwise. Linear retardance is the difference between two orthogonal indices of refraction times the thickness of the optical element. Linear retardance causes a phase difference between two orthogonal linear polarizations, where one polarization is aligned parallel to the extra-ordinary axis of the linear retarder and the other polarization is aligned parallel to the ordinary axis of the linear retarder. In contrast, circular retardance causes a relative phase difference between right- and left-handed circular polarized light.

Linear retardance may be described as either in-plane or out-of-plane retardance. In-plane retardance (IPR), expressed as optical path length difference, refers to the difference between two orthogonal in-plane indices of refraction times the physical thickness of the optical element. Out-of-plane retardance refers to the difference of the index of refraction along the thickness direction (z direction) of the optical element and one in-plane index of refraction, or an average of in-plane indices of refraction, times the physical thickness of the optical element. Normal incidence rays in a cone bundle see only in-plane retardance, whereas off-axis rays including oblique rays (i.e. non-normal but along the principal S- and P-planes) and skew rays (i.e. non-normal and incident away from the principal S- and P-planes) experience both out-of-plane retardance and in-plane retardance.

In the absence of trim retarders 21, the P-polarized light that illuminates each microdisplay panel in the dark (off) state is slightly elliptically polarized upon reflection due to the residual birefringence of the LCoS panels 20. When the elliptically polarized light, which contains both a P- and an S-component, is transmitted to the corresponding WGP 15, 14, 13, the S component is reflected to the X-cube 19 thus allowing dark state light leakage onto the large screen and limiting the contrast of the projection system.

The TR-compensated LCoS panel comprising the TR 21 and LCoS panel 20, also referred to as the imager assembly, is schematically shown in FIG. 2 in the context of a single-channel optical system 25. An input ray 26 within the defined cone angle range is preferentially polarized by a pre-polarizer 23, its polarization contrast further enhanced by a polarization beam splitter (PBS) 14, such as a WGP, this linearly polarized ray is pre-conditioned to be an elliptical polarized light upon transmission through the retarder compensator 21 and the residual birefringence in the LCoS panel 20 substantially undoes the ellipticity such that on double pass through the cascade of retarder compensator 21 and LCoS 20 devices, a linear polarization light output is obtained, which is ideally returned to the illumination system as 27 and not being deflected to the projection lens/screen by the PBS 14.

The origin of the residual retardance of an LCoS panel in a dark state is illustrated in FIG. 3, schematically showing the dark-state LC molecules orientation in one cell 70 of a VAN-LCoS display panel 20. The VAN-LCoS cell 70 comprises a substrate 71 and a cover glass 72, sandwiching a LC gap, 73 of a vertical size d. The cell 70 is filled with a nematic liquid crystal with its LC director 74 aligned at a slight polar angle tilt, $\theta_c$, 75 from the device normal, i.e. the Z-axis direction, and the projection of the LC director onto the plane of device is oriented at an azimuthal offset $\phi_c$ 76 from the X-axis. The in-plane $\Gamma_{aLC}$ and out-of-plane $\Gamma_{cLC}$ retardance of the LCoS cell are given by a known quadratic effective index formula.

For a very small pre-tilt angle (<<10°) and low birefringence, the in-plane and out-of-plane retardances are approximately the squares of sine and cosine of the pre-tilt angle multiplied by the LCoS cell retardance $\Delta n \cdot d$, respectively, where the birefringence $\Delta n = (n_e - n_o)$ is the difference between the extraordinary refractive index $n_e$ and the ordinary refractive index $n_o$ of the LC material in the LCoS cell 70.

The use of trim retarders 21 improves the contrast level by providing in-plane retardance that compensates for the retardance resulting from the residual birefringence in the respective LCoS panels 20. More specifically, the trim retarders 21 can be selected to have the same single-pass IPR as the corresponding LCoS displays 20, and oriented such that their slow axes are at orthogonal azimuthal alignment to the slow axes of the LCoS panels 20, while their fast axes are at orthogonal azimuthal alignment to the fast axes of the LCoS panels 20, resulting in a configuration conventionally termed "crossed axes" configuration. This TR/LCoS panel configuration is illustrated in FIG. 4 by arrows 61 and 63, with the arrow 61 representing the LCoS 20 slow axis, and the arrow 63 representing the TR 21 slow axis. The terms slow axis (SA) and fast axis (FA), as used herein, refer to the two orthogonal birefringent axes when the linear retardance is measured at normal incidence. Notably, the SA and FA directions may change with off-axis illumination.

The LCoS SA 61 is shown in the second quadrant, with an azimuthal angle of 62, relative to the +X-axis; a right-hand XYZ coordinate system is assumed, RH-XYZ, with the z-axis directed normally to the LCoS/TR plane, and the x-axis directed along the polarization direction of the incident P-polarized light, with the y-axis directed along the polarization direction of the S-polarized light; this relationship between the three axes of the XYZ coordinate system and the polarization orientation of the incident and reflected light is assumed throughout this document. The SA 61 of the LCoS panel is typically oriented to be substantially parallel to the bisector of the S- and P-axes. Notably, orienting the slow axis of the VAN-LCoS at ±45° or ±135° is important for the VAN-LCoS panel to function as an efficient electrically-controlled birefringence (ECB) device, providing a crossed polarization conversion of light according to equation (1):

$$\frac{I_{(output\ crossed\ polarization)}}{I_{(input\ linear\ polarization)}} = \left[\sin\left(\frac{2\Gamma_{eff}}{\lambda}\pi\right)\sin(2\phi)\right]^2 \quad (1)$$

where $\Gamma_{eff}$ is the effective single-pass voltage-dependent retardance, in length units, as seen by the incident ray, $\lambda$ is the illumination wavelength, and $\phi$ is the azimuthal orientation angle of the slow-axis relative to the P-polarization. In this configuration, the VAN-LCoS in an on-state functions approximately as a quarter-waveplate retarder in a single pass.

Once the slow axes 61, 63 of the trim retarders 21 and LCoS panels 20 are configured at orthogonal azimuthal orientations, a component of the incident light polarized along the SA 63 of the TR 21 will alternately experience a larger delay when propagating through the TR 21, and a smaller delay when propagating through the LCoS panel 20; conversely, a component of the incident light polarized along the FA of the TR 21, which is directed along the LCoS SA 61, will alternately experience a smaller delay when propagating through the TR 21, and a larger delay when propagating through the LCoS panel 20. If the one-way retardance of the LCoS 20 is equal to that of the TR 21, the net effect is a zero relative delay for the two orthogonal components of the incoming polarization, and as a result, an unchanged polarization of the incident light after propagation through the TR/LCoS assembly 20, 21; i.e., the output light has the same polarization as the incident light. The corresponding WGP 14 and/or an optional clean-up polarizer then rejects the output light so that the dark-state panel leakage does not appear on the screen. Since the trim retarder 21 does not alter significantly the throughput of the LCoS panel on-state, the resulting sequential contrast (full on/full off) is substantially improved.

In addition to providing in-plane retardance, it is common for trim retarders 21 to also provide out-of-plane retardance to increase the field of view. More specifically, it is common for trim retarders to include both an A-plate compensation component for compensating the in-plane retardance and a -C-plate compensation component for compensating the out-of plane retardance. Optionally, the trim retarders 21 also include an O-plate component. An A-plate is an optical retarder formed from a uniaxially birefringent material having its extraordinary axis oriented parallel to the plane of the plate. A C-plate is an optical retarder formed from a uniaxially birefringent material having its extraordinary axis oriented perpendicular to the plane of the plate, i.e. parallel to the direction of normally incident light. A -C-plate exhibits negative birefringence. An O-plate is an optical retarder formed from a uniaxial birefringent element having its extraordinary axis, i.e., its optic axis or c-axis, oriented at an oblique angle with respect to the plane of the plate.

As discussed above, the trim retarder 21 ideally provides an A-plate retardance that matches the in-plane retardance of the corresponding LCoS panel 20 in the off-state. In practice, however, the A-plate retardance of both the LCoS panels 20 and the trim retarders 21 tends to vary within each component due to manufacturing tolerances in device thickness and material birefringence control, as well as due to operational drifts (temperature, mechanical stress etc). As a result, to ensure adequate compensation it is common to provide a higher A-plate retardance in the trim retarders 21 than that exhibited by the LCoS panels 20. For example, a trim retarder with an A-plate retardance of 5 nm is often provided to compensate for a vertical aligned nematic (VAN) LCoS exhibiting a 2 nm A-plate retardance at the same wavelength $\lambda$.

As is known to those skilled in the art, this mismatch in A-plate value requires offsetting of the SA of the trim retarder 21, relative to the crossed axes orientation 63 described above, and the optimal contrast is obtained by deviating from the crossed axes configurations. In other words, the trim retarder is mechanically 'clocked-in' by rotating its azimuth orientation away from the crossed-axes configuration by an angle $\phi_{ob}$ that is referred to as an over-clocking angle. When the slow and fast axes of the VAN-LCoS panel bisect the S- and P-polarization planes, as discussed above, the over-clocking angle, $\phi_{ob}$, of a higher IPR value trim retarder is calculated from the following equation:

$$\phi_{ob} \approx \frac{\cos^{-1}([\Gamma_{aLC}/\Gamma_{aTR}])}{2} \quad (2)$$

where $\Gamma_{aTR}$ is the trim retarder A-plate retardance and $\Gamma_{aLC}$ is the LCoS A-plate retardance, with $\Gamma_{aTR} > \Gamma_{aLC}$.

Referring to Table 1, the calculated over-clocking angles for trim retarders providing 2 to 10 nm A-plate retardance for compensating an LCoS panel exhibiting 2 nm A-plate retardance are shown. Both positive and negative azimuthal offsets are given. In addition, two more azimuthal locations are found in the opposite quadrant (i.e., the listed over-clocking angles ±180°).

TABLE 1

Approximate over-clocking angles of the trim retarder compensator/VAN-LCoS pair from the nominal crossed-axes configuration.

| $\Gamma_a$(TR) | Over-clocked angle from nominal crossed axes |
|---|---|
| 2 | 0 |
| 3 | ±24.1 |
| 4 | ±30.0 |
| 5 | ±33.2 |
| 6 | ±35.3 |
| 7 | ±36.7 |
| 8 | ±37.8 |
| 9 | ±38.6 |
| 10 | ±39.2 |

The mechanical rotation of a discrete trim retarder compensator relative to an LCoS panel as a means of optimizing the LCoS panel contrast is the prevalent assembly methodology in the LCoS display industry, having as large as 20% in-plane retardance distribution from part to part over a large batch of wafers. The active mechanical alignment of each LCoS-TR pair, referred to as the mechanical 'clocking', has the required angle granularity to always clock in any given panel.

FIGS. 1 and 2 illustrate a conventional arrangement of a TR/LCD panel assembly, also referred to as the imager assembly, wherein the TR 21 and the LCD panel 20 are separately fabricated elements that are disposed next to each other and held together by a mechanical means. Such an imager assembly, which provides the TR rotation capability for active mechanical clocking of the TR position while protecting the LCoS panel from outside dust, is disclosed in a pending U.S. patent application Ser. No. 11/358,605, which is assigned to the assignee of the instant application. Although the imager assembly simplifies the active mechanical clocking of the TR/LCD panel pair, the associated individual active rotational adjustment of each imager assembly is still time and resource consuming.

An alternative arrangement would be to provide one-piece imager assemblies wherein an LCoS panel is integrated with a TR compensator, as described e.g. in a pending US Patent application 2005/0128391 assigned to the assignee of the current application. Advantageously, this LCoS panel/TR integration could be performed at a wafer level at the same manufacturing step where the LCoS panels are produced, resulting in one-step manufacturing of a plurality of the imager assemblies from a single compensated wafer. However, due to the variations in the residual IPR of the individual LCoS panels from the wafer, this approach would result in inaccurate retardance compensation for at least some of the imager assemblies, and will lower the production yield of high-contrast imager panels.

It is therefore desirable to provide a method for compensating the residual in-plane retardance of the LCoS display panels that does not require the individual mechanical LCoS panel-trim retarder alignment, or clocking, while providing high system contrast.

Accordingly, an object of the present invention is to provide a TR-LCD panel assembly that does not require the step of active mechanical clocking for providing high system contrast.

Another object of the present invention is to provide a method of electronic tuning of the TR-LCD panel polarization alignment for providing a high system contrast.

Another object of the present invention is to provide a method for electronic compensation of the residual in-plane retardance of the LCD panel.

Another object of the present invention is to provide a method of wafer-level manufacturing of the LCD panel-trim retarder assemblies that are suitable for electronic contrast adjustment.

Another object of the present invention is to provide a method for electronic tuning of the image contrast in LCD-based image forming devices.

SUMMARY OF THE INVENTION

In accordance with the invention, a method is provided for compensating, or at least lessening unwanted effects from a residual in-plane retardance of a liquid crystal display (LCD) panel for an incident light beam having a pre-determined polarization. The method comprises the following general steps: a) optically coupling a trim retarder with the LCD panel, the trim retarder having an in-plane retardance greater than the residual in-plane retardance of the LCD panel; b) orienting the trim retarder relative to the LCD panel in a fixed position so that a polarization-changing effect of the residual retardance of the LCD panel on the incident beam is at least partially compensated by a polarization-changing effect of the trim retarder; and, c) adjusting at least one of a voltage to the LCD panel, a temperature of the LCD panel and a temperature of the trim retarder, so as to lessen a combined polarization changing effect of the LCD panel and the trim retarder on the pre-determined polarization state of the incident light beam, to attain a dark-state operation condition of the LCD panel.

In accordance with one embodiment of the invention, step (b) comprises orienting the trim retarder relative to the LCD panel so as to over-compensate the residual in-plane retardance of the LCD panel for the incident light, and step (c) comprises d) applying the voltage to the LCD panel for changing the magnitude of the LCD panel in-plane retardance away from the residual in-plane retardance; e) adjusting the voltage to the LCD panel so as to substantially minimize the combined polarization changing effect of the LCD panel and the trim retarder on the pre-determined polarization state of the incident light beam; and, f) utilizing the adjusted voltage as a dark state voltage of the LCD panel.

Another aspect of the present invention relates to an LCD assembly for modulating a light beam incident thereupon in a pre-determined linear polarization state, comprising an LCD panel having a residual in-plane retardance in a dark state, and a retardance compensating element disposed in the path of the incident light beam for over-compensating the residual in-plane retardance of the LCD panel for the light beam, so as to induce a cross-polarization conversion of the light beam at the output of the LCD assembly that can be lessened by a voltage applied to the LCD panel.

Another feature of the present invention provides an LCD panel assembly for modulating a light beam incident thereupon in a pre-determined linear polarization state, comprising: an LCD panel having a residual in-plane retardance in a dark state and comprising an array of LC pixels, and a retardance compensating element disposed in the path of the light beam for at least partially compensating the polarization-changing effect from the residual in-plane retardance of the LCD panel for the light beam, wherein the LCD panel is sectionalized into a plurality of sections, each section comprising a spatial groupings of pixels, and wherein in operation each of said groupings of pixels is driven by a voltage waveform associated with a distinct dark-state voltage that is different from respective dark-state voltages for the other groupings of pixels, so as to improve spatial uniformity of a resulting image contrast in comparison with an image contrast resulting from using a same dark-state voltage for each of said groupings of pixels.

Another aspect of the present invention provides a method of LCD panel manufacturing. The method comprises the following steps: providing a backplane wafer comprising a plurality of back-plane wafer portions configured for forming a plurality of LCD panels each having a residual in-plane retardance, providing a trim retarder wafer having an in-plane retardance greater than the residual in-plane retardance of each of the plurality of LCD panels, disposing the trim retarder wafer over the back-plane wafer with a gap therebetween for holding an LC layer, bonding the trim retarder wafer to the back-plane wafer in a fixed relative orientation for forming an LCD panel assembly array, and dicing the LCD panel assembly array into a plurality of individual LCD panel assemblies, each comprising an LCD panel integrated with a trim retarder; wherein the fixed relative orientation of the trim retarder wafer and the back-plane wafer is selected so as to over-compensate the residual in-plane retardance of at least a majority of the LCD panels for an incident beam having a pre-determined polarization state, to enable electronic contrast enhancement by adjusting dark state voltages for the at least the majority of the individual LCD panel assemblies.

BRIEF DESCRIPTION OF THE DRAWINGS

The invention will be described in greater detail with reference to the accompanying drawings which represent preferred embodiments thereof, wherein.

DETAILED DESCRIPTION OF EXEMPLARY EMBODIMENTS

Definition of Terms

Figure 1:
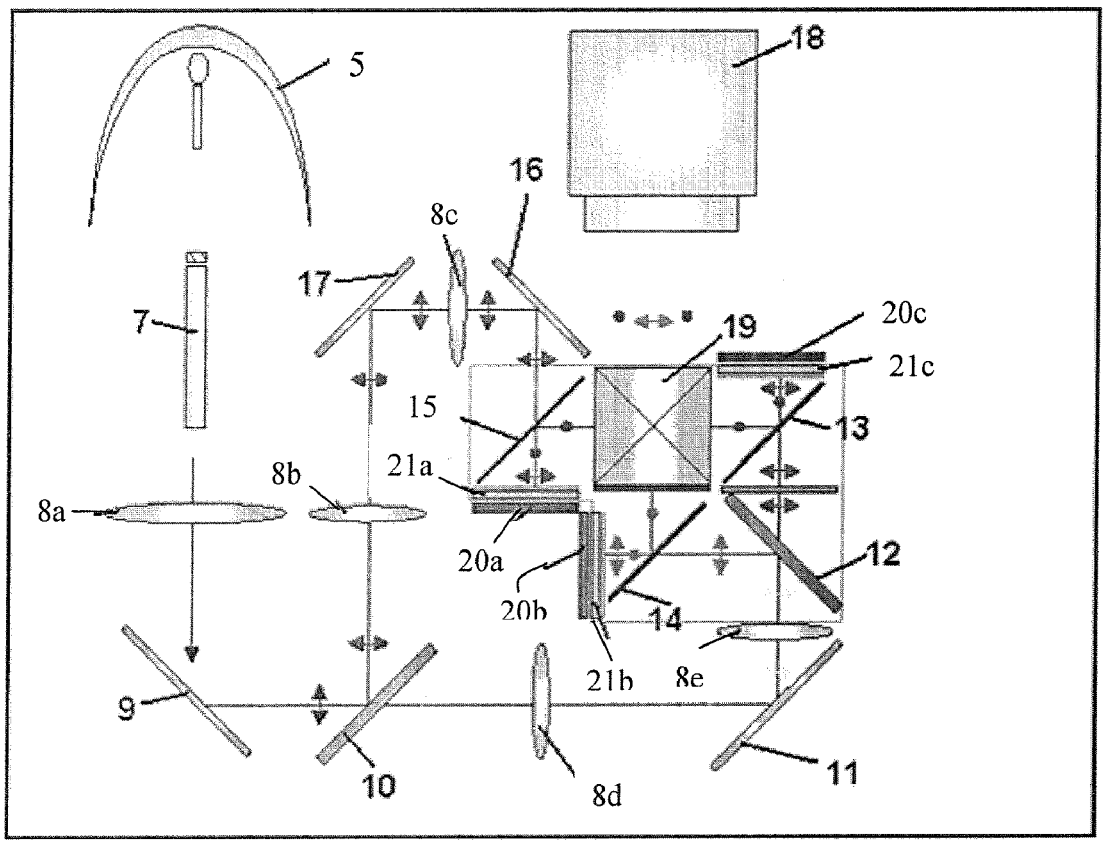
FIG. 1 is a schematic diagram of the prior art Ultrex-3 3-panel WGP based LCoS projection light engine.

In connection with optical polarization, compensation and retardation layers, films or plates as described in the present application, the following definitions of terms as used throughout this application are given.

The term "optic axis", when referred to a birefringent material such as a liquid crystal (LC), is used to mean an axis in the material whereby a light ray propagating along this axis does not experience birefringence. Hereinafter in the specification the LC materials used in LCD panels are assumed to be optically uniaxial and have positive birefringence, i.e. the extraordinary refractive index $n_e$ is the highest refractive index of the material, wherein the optic axis coincides with the extraordinary axis.

The term "slow axis" (SA) as used herein means the projection of the optic axis of the birefringent film (or plate, or layer) on the film plane.

The terms 'tilted structure' or 'tilted orientation' means that the optic axis of the film is tilted at an angle θ between 0 and 90 degrees relative to the film normal.

The term 'homeotropic structure' or 'homeotropic orientation' means that the optic axis of the film is substantially perpendicular to the film plane, i.e. substantially parallel to the film normal.

The term 'dark-sate (bright-state) voltage' mean voltage $U_d(U_b)$ applied across the LC material of an LCD panel or an LC cell for minimizing (maximizing) optical throughput of a respective color channel wherein said LCD panel or LC cell is used, thereby minimizing (maximizing) the brightness of a resulting image produced by said panel or cell.

The term 'nominal dark-state (bright-state) voltage' is used to mean dark-state (bright-state) voltage $U_{dnom}$ ($U_{bnom}$) applied to the LC film of an LCD panel that is specified for a plurality of LCD panels of a particular type on the basis of a nominal, or expected, electro-optical (EO) characteristic of the LCD panels and capabilities of electrical circuitry driving these LCD panels, e.g. the silicon backplane CMOS in the case of LCoS panels. The relevant EO characteristic is, for example, the LCD panel cross-polarization reflectance R for a light beam of a pre-defined polarization, e.g. the P-polarized beam at normal incidence, in dependence on a voltage U applied across the LC layer of the LCD panel. The nominal EO characteristic could be in this case a computed R(U) dependence for a given nominal thickness of the LC layer assuming known LC parameters, or an R(U) dependence obtained by averaging measurement results for a plurality of the LCD panels, preferably having same design parameters.

The terms 'TR clock-in', or 'TR clocking' mean mechanically orientating a TR relative to an LCD panel to which it is optically coupled at a pre-determined relative azimuthal orientation in the plane of the panel; the terms 'optimally clock-in' or 'optimal clocking' in relation to the TR/LCD panel pair is used to mean that said pre-determined relative orientation is such that a polarization-changing effect of the residual IPR of the LCD panel on an incident beam having a pre-determined linear polarization is compensated by a polarization changing effect of the TR on said beam, so that the combined, or net polarization-changing effect of the TR/LCD panel assembly is substantially minimized.

Other terms and notations used in the specification will be explained hereinafter as they are introduced.

The present invention in one general aspect thereof provides a method for compensating the residual in-plane retardance of an LCD panel with a TR compensator, which includes two general steps: the step of coarse mechanical alignment of the TR-LCD panel pair in a pre-determined relative azimuthal orientation, with said orientation being preferably but not necessarily the same for a plurality of LCD panel-TR pairs, and the step of non-mechanical fine-tuning of the dark state conditions of the resulting LCD panel/TR assembly for increasing the panel on/off contrast ratio, e.g. by adjusting at least one of: a dark-state voltage of the LCD panel, a temperature of the LCD panel, and a temperature of the TR.

The invention will be described hereinbelow with reference to particular embodiments thereof, but is not limited to said embodiments. In particular, the invention will be described with reference to LCD panels embodied as reflective VAN-mode LCoS panels for use in image projecting systems of the type shown in FIG. 1; accordingly, the terms "LCD panel" and "LCoS panel" will be used in the herein following description interchangeably. However, those skilled in the art will appreciate that the invention is also applicable to TN-mode reflective LCoS panels, and other types of reflective and transmissive LCD panels having a nearly-homeotropic orientation of the LC director in the dark state.

Figure 5:
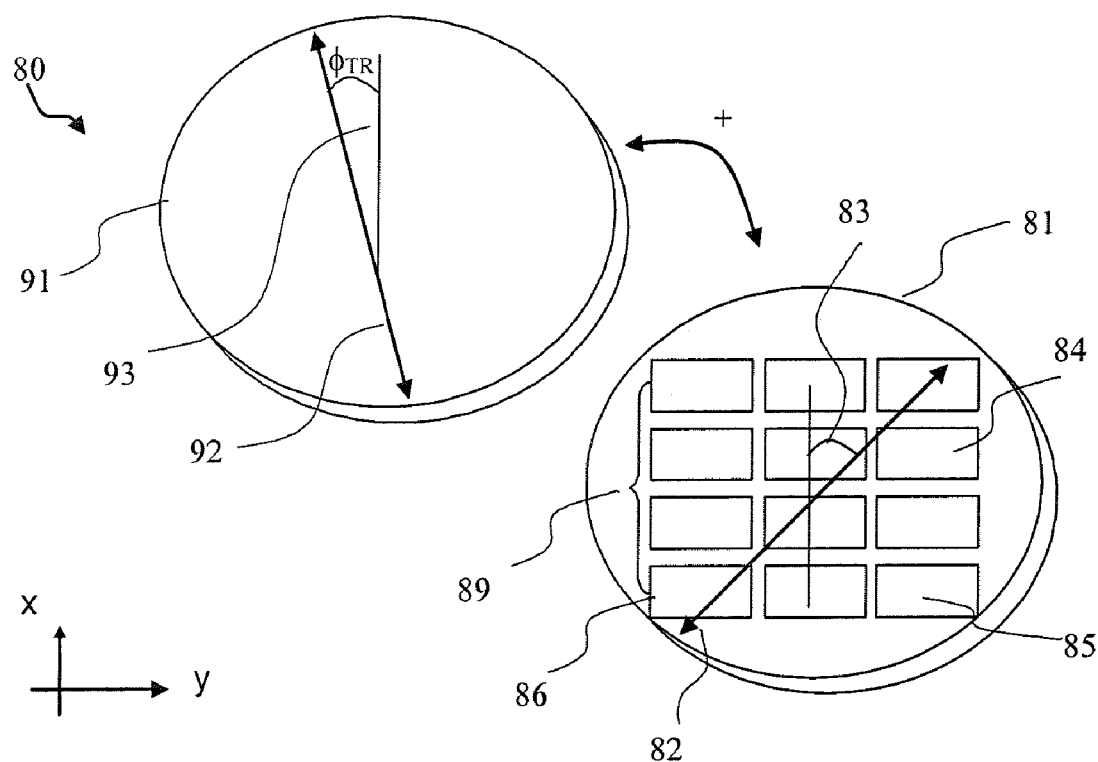
FIG. 5 is a schematic diagram illustrating wafer-level fabrication of the integrated TR/LCoS assemblies according to the present invention.

A first aspect of the invention provides a method of LCD panel manufacturing wherein a TR compensator is integrated with the LCD panel at a wafer level, as illustrated in FIG. 5.

According to this aspect of the invention, an entire trim retarder wafer 91 is bonded to a Silicon (Si) backplane wafer 81 wherein a plurality 89 of LCD backplane devices are defined, sandwiching a gap for LC filling. This process includes the following general steps:

a) providing the silicon backplane wafer 81 comprising a plurality 89 of backplane wafer portions configured for forming a plurality of LCD panels;

b) providing a trim retarder wafer 91 having an in-plane retardance that is greater than the in-plane retardance of each of the plurality of LCD panels that will be formed from the silicon backplane wafer 81;

c) disposing the trim retarder wafer 91 over the backplane wafer 81 with a gap therebetween for holding an LC layer;

d) bonding the trim retarder wafer 91 to the backplane wafer 81 in a fixed relative orientation for forming an LCD panel assembly array from the plurality 89 of the backplane wafer portions; and, e) dicing the LCD panel assembly array into a plurality of individual LCD panel assemblies, each comprising an LCD panel integrated with a trim retarder.

In one embodiment, the resulting assembly 80 is brought together by laminating the TR wafer 91 onto the Silicon backplane wafer 81. The TR wafer 91 is formed by coating a cover glass with a birefringent retardance compensating film having pre-defined A-plate and C-plate retardance on one surface thereof, and ITO and alignment layers on a second surface. The homogenous trim retarder wafer has a nominal slow-axis 92, forming a pre-defined azimuthal angle 93 with respect to the X-axis. The top side of the silicon backplane wafer 81 onto which the TR wafer 91 is laminated has an array of reflective pixel electrodes which have been pre-fabricated onto said wafer 81 together with underlining electrical driving circuitry, each reflector defining an LC cell also referred to herein as an LC pixel, with individual adhesive seal line defining each backplane LCD panel portion, also referred to herein as LCoS die. In the shown exemplary embodiment, the Si backplane wafer 81 has 12 backplane LCD panel portions of rectangular shape, e.g. portions 84 and 85, arranged in a 3×4 array 89. The top surface of the LCoS wafer 81 facing the TR wafer 91 has been treated with an alignment layer which subsequently anchors a nominal slow-axis 82 of the LC cells at an azimuthal angle 83 with respect to the X-axis. After the TR wafer 91 is bonded to the LCoS wafer 81 with the LC material filling the gap therebetween, the resulting pre-compensated LCoS wafer assembly 80 includes the LCD (LCOS) panel array 89 of 12 individual TR/LCD panel assemblies; since these assemblies are defined by their respective backplane portions, e.g. 84, 85, said LCD panel assemblies will be referred to hereinafter by the reference numerals of their respective Si backplane portions, e.g. 84, 85; these TR/LCD panel assemblies will also referred to hereinafter as compensated LCD panels, pre-compensated LCD/LCoS panels, or mechanically compensated LCD/LCoS panels.

Figure 6:
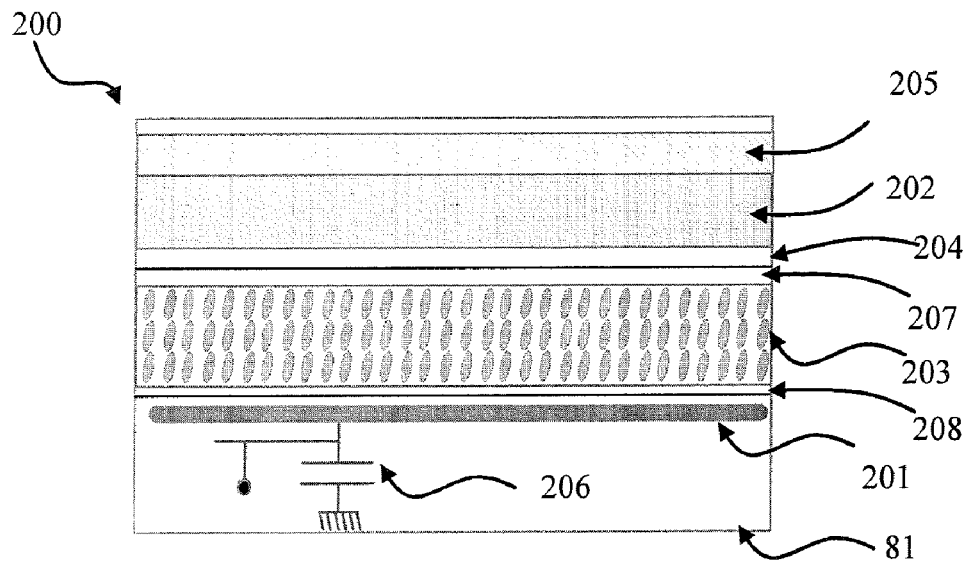
FIG. 6 is a cross-sectional view of a single pixel in the integrated LCoS panel/TR assembly.

FIG. 6 schematically shows a cross-section of one LC cell, or LC pixel 200 of the resulting integrated LCoS/TR assembly 80. The reflective electrode, or pixel reflector 201 is fabricated onto the silicon substrate 81; it can be embodied as an optical-grade aluminum or a dielectric-enhanced metal reflector. The pixel reflector 201 is electrically biased by a switching element 206 of, for example, a complementary metal oxide semiconductor (CMOS) type, provided in the Si substrate 81. The pixel reflector 201 is configured such that a driving voltage V is applied thereon by the switching element 206.

The cover glass 202 forms an LC cell gap with the pixel reflector 201 and this cell gap is filled with LC mixture 203. A transparent conductive oxide (ITO) layer 204 is coated on the surface of cover glass 202 facing the LC layer 203. LC alignment layers 208, 207 are coated on the top surface of the silicon wafer 81 and the lower surface of the ITO layer 204, respectively, to anchor the LC 203 molecule orientations. A retardance compensating element in the form of a birefringent film 205 is disposed on the other surface of the cover glass 202. The LC molecules are driven to a variety of optical states by applying a voltage U across the LC cell between the ITO electrode 204 and the backplane reflector 201. This voltage U is the difference of the backplane reflector 201 voltage V and the ITO 204 voltage W, and will be referred to as the LC voltage.

For a given LC gap size d and a given composition of the LC material 203, the LC alignment layers 208, 207 determine a nominal orientation of the LCoS wafer SA 82, and a nominal residual IPR thereof $\Gamma_{LCnom}$, i.e. the LCoS panel IPR in the relaxed LC state, when the LC voltage U is zero or close to zero. Similarly, the nominal SA 92 of the TR wafer 91 and its nominal IPR $\Gamma_{TRnom}$ are defined by the composition, thickness and molecular orientation of the retarder compensator film 205. Note that here and in the following, where it does not lead to a confusion, we have dropped the subscript 'a' from the IPR notation $\Gamma_a$, e.g. $\Gamma_{aLC} \equiv \Gamma_{LC}$, since this specification is primarily concerned with the in-plane retardance.

The selection of the relative orientation of the TR wafer 91 and the Si backplane wafer 81, which is defined by the azimuthal angles 83 and 93, in the wafer assembly 80 according to the present invention will now be described.

Were the retardance and SA orientations of the wafers 81 and 91 uniform across each of said wafers and defined by the respective nominal wafer parameters, the conventional approach would be e.g. to use the aforedescribed 'over-clocking' arrangement, wherein $\Gamma_{TRnom}$ is selected to exceed $\Gamma_{LCnom}$, with the over-clocking azimuthal orientation of the TR and LCoS wafers 91, 81 defined by equation 2.

Figure 3:
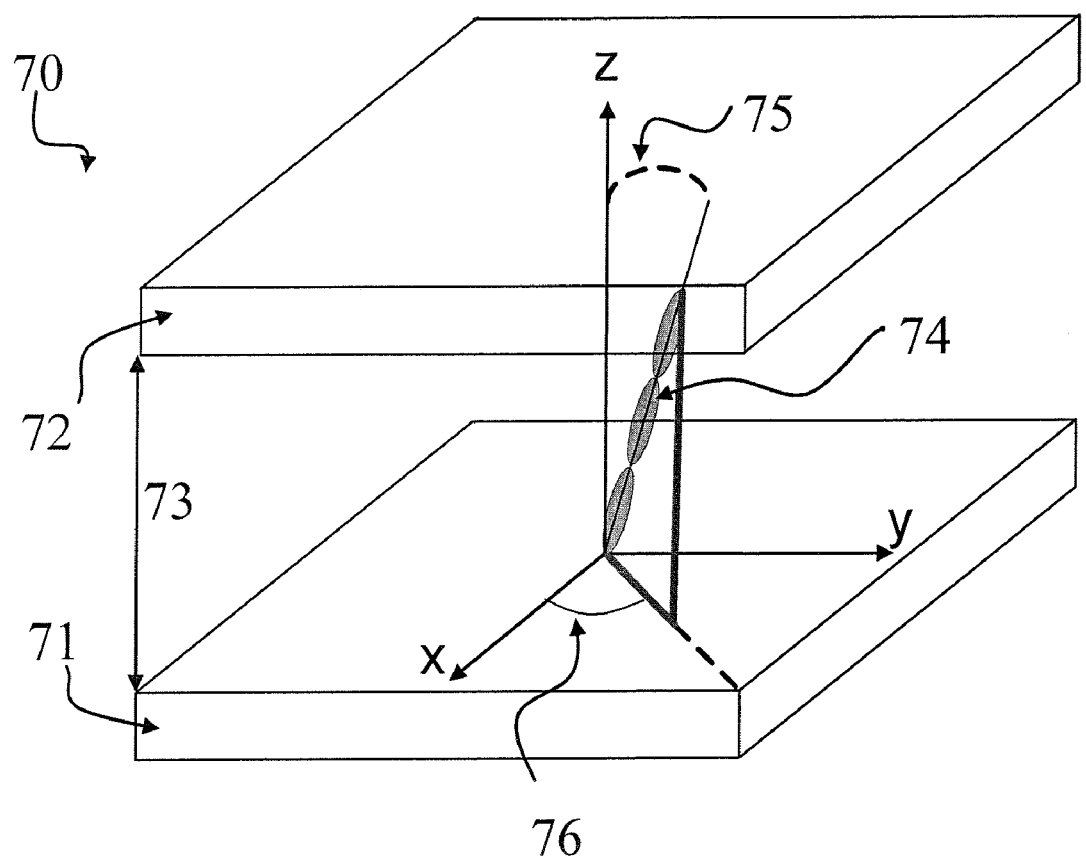
FIG. 3 is a schematic view of a VAN LCoS cell showing the LC director pre-tilt in a dark state.
Figure 7:
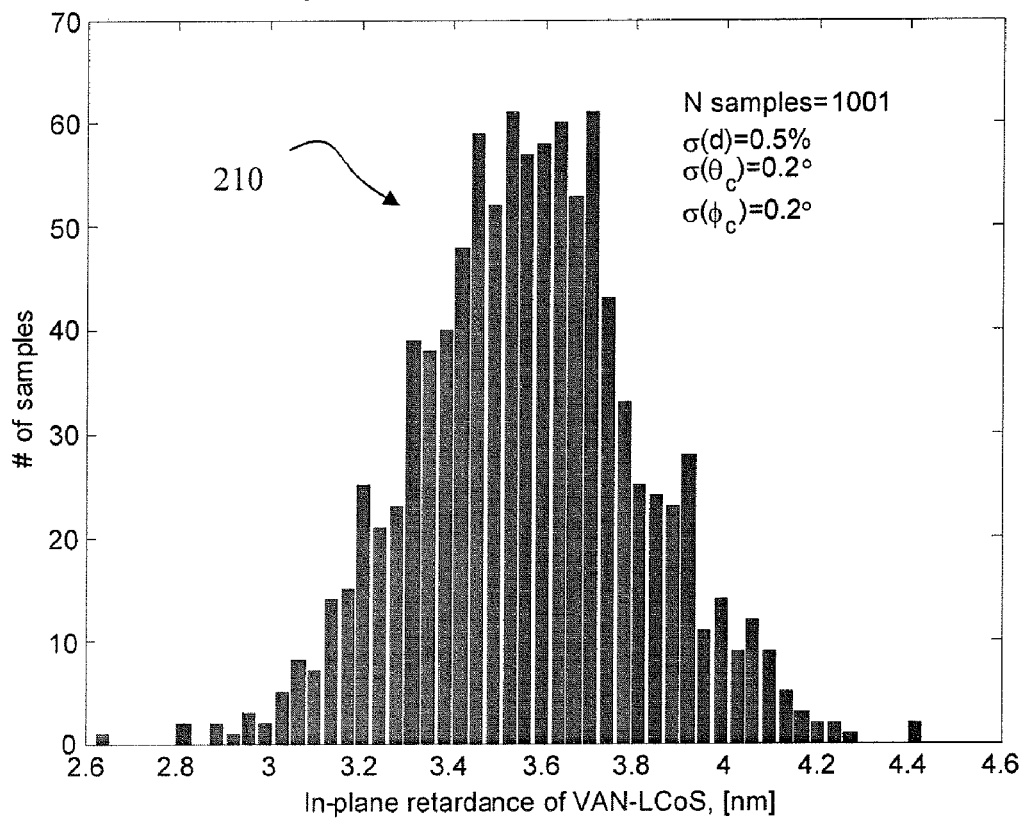
FIG. 7 is a graph showing a simulated distribution of the residual in-plane retardance for randomly selected 1001 VAN-LCoS panels.
Figure 8:
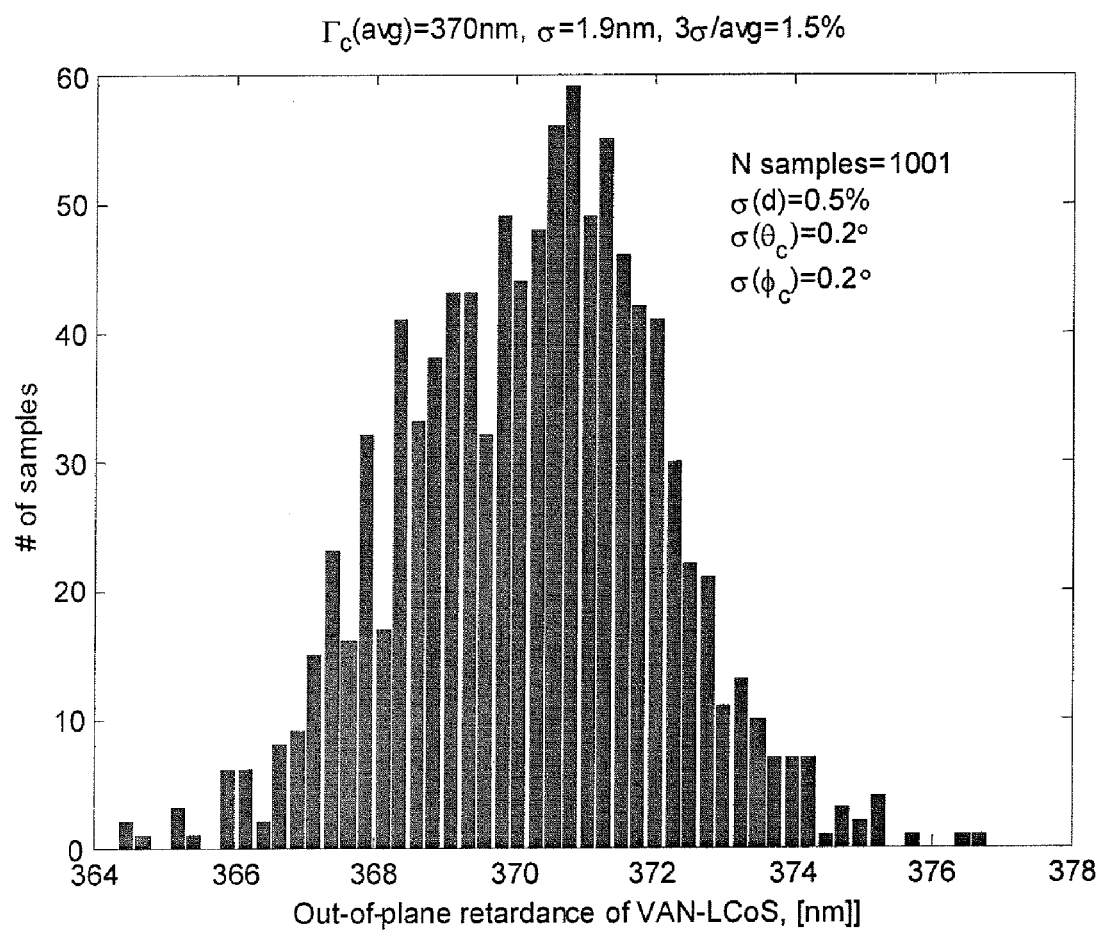
FIG. 8 is a graph showing a simulated distribution of the residual out-of-plane retardance for randomly selected 1001 VAN-LCoS panels.

However, in practice the residual LCoS retardance can have substantial variations across the LCoS wafer 81, e.g. due to variations in the LC gap size d, the LC composition, and the pre-tilt angle 75 (FIG. 3). An exemplary distribution of the LCoS a-plate and c-plate residual retardance is illustrated in FIGS. 7 and 8, respectively. These figures show results of a Monte Carlo simulation of the residual retardance of a typical VAN-LCoS cell with normally distributed cell parameters: the cell gap size d, the polar pre-tilt angle $\theta_c$ and the LC director azimuthal angle $\phi_c$, assuming typical nominal, or average LC cell parameters values d=1.5 μm, $n_o$=1.50, $n_e$=1.65, $\theta_c$=6 deg, $\phi_c$=45-deg, with the standard deviations $\sigma(d)$=0.5%, $\sigma(\theta_c)$=$\sigma(\phi_c)$=0.2°. The simulation results indicate that the normalized ±3σ residual in-plane retardance variation can be rather large, e.g. 21% in this example, while the relative out-of-plane retardance varies relatively insignificantly, e.g. by only about 1.5%. Therefore, the residual IPR variations would typically have comparatively larger impact on the panel performance if left uncompensated.

Because of the variations of the LCoS residual retardance across a wafer, the LC layer of the LCoS wafer portions 84 and 85 can potentially exhibit substantial, e.g. up to ±20% as FIG. 7 indicates, difference in the residual IPR. The retardance of the trim retarder compensator 205 also varies across the wafer 91, albeit with typically a substantially tighter distribution, e.g. within about ±3% of IPR magnitude.

According to the invention, the wafer-level approach to manufacturing of LCoS/TR assemblies 89 described hereinabove with reference to FIG. 5 is supplemented by a second fine-tuning step in order to match the retardance and axis orientation of a given LCoS die, e.g. 84, 85, to the retardance and axis orientation of its paired portion of the trim retarder wafer 91. The second fine-tuning step may include non-mechanical voltage tuning of the LC layer in the LCoS die 84 or 85, or temperature adjustment of either or both the trim retarder and LCoS die.

The selection of the relative orientation of the TR wafer 91 with respect to the Si backplane wafer 81, and the subsequent step of non-mechanical tuning of the resulting assembly 80 in one embodiment of the invention can be described with reference to FIG. 13. In this figure, the horizontal axis in the diagram represents the IPR magnitude, while the bell-shaped curve 101 represents a distribution of the residual IPR magnitudes for a plurality of undriven, or driven by a same dark state voltage $U_d$, LCoS panels, such as the distribution 210 in FIG. 7. The plurality of LCoS panels to which the distribution 101 relates could refer to uncompensated LCoS panels from one wafer, from a batch of wafers, or from a large number of LCoS batches. By way of example, an LCoS panel corresponding to the 'plus' tail of the distribution 210 or 101 at ~3σ level and having a 20% higher in-plane retardance than that of the 'nominal' panel is termed the 'plus panel', whereas an LCoS panel having a 20% lower in-plane retardance is termed the 'minus panel'. The IPR magnitudes of the minus panel, nominal panel and plus panel of the distribution are indicated with vertical arrows 103, 102, and 104, respectively. In the exemplary embodiment considered herein, the plus (104) and minus (103) panels define the range of the residual IPR values to be compensated using the TR wafer 91.

In line with the prior-art 'over-clocking' approach described hereinabove with reference to FIG. 4, the nominal IPR 108 of the TR wafer 91 is selected to be greater than the IPR 104 of the plus panel, so that any LCoS panel from the plurality of panels to which the distribution 101 relates can be compensated using a portion of the TR wafer 91; herein we assume for clarity that the variation of the IPR magnitude of the TR waver is small compared to the width of the LCoS IPR distribution 101. However, contrary to the individual mechanical TR 'clocking' of the prior art, in the current invention all LCoS devices on the single wafer 80 are mechanically 'clocked in' at once.

In accordance with the current invention, a target LCoS IPR 105 for optimal mechanical clocking is chosen when bonding the TR wafer 91 to the LCoS wafer 81. With the wafer-level assembly, the target IPR may not be the average of LCoS wafer retardance and may not even be the statistical average of all LCoS panels from a large number of wafers and batches. In a preferred embodiment of the invention, the fixed relative orientation of the trim retarder wafer 91 and the Si backplane wafer 81, which is defined by the azimuthal angles 93 and 83, is selected so as to over-compensate, for an incident beam having a pre-determined polarization state, the residual in-plane retardance of at least a majority of the LCoS panels from the wafer 80, or from a batch of such compensated LCoS wafers, or from a number of such wafer batches. This over-compensation, as explained hereinafter more in detail, enables subsequent electronic contrast enhancement by adjusting dark state voltages for the at least the majority of the individual LCoS panel assemblies.

Figure 14:
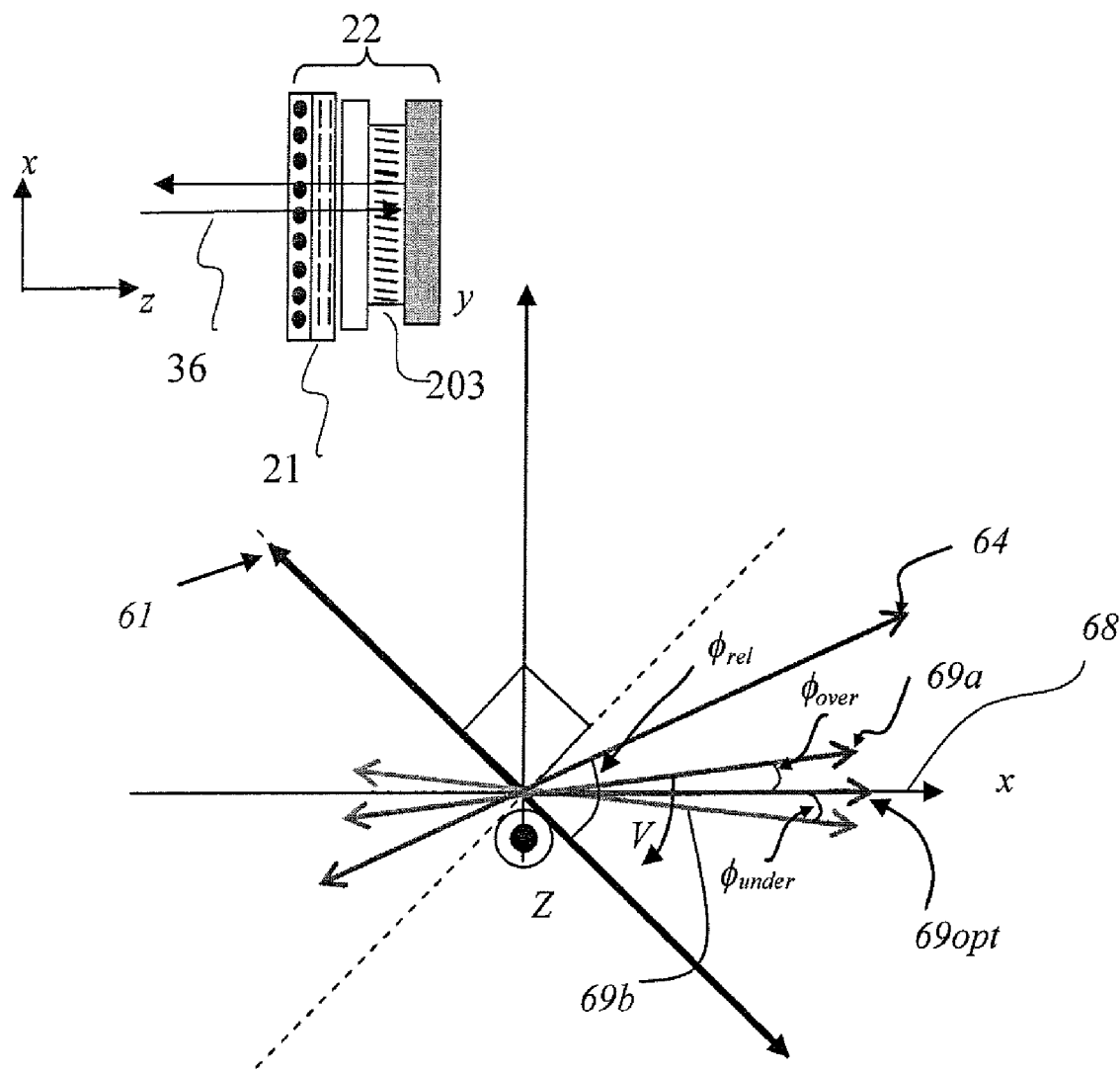
FIG. 14 is a vector diagram illustrating the over-compensating TR arrangement of the present invention.

The term 'overcompensation', as used herein, refers to a particular TR-LCD panel arrangement in a TR/LCD panel assembly wherein the TR is oriented to provide optimal compensation of a larger residual IPR than that of the LCD panel said TR is coupled with, for a normal-incidence beam having a pre-determined polarization. This can be further illustrated with reference to FIG. 14, showing the SA 61 and 64 of an LC layer 203 and of the compensating TR 21, respectively, for a TR/LCD panel assembly 22. The pre-determined polarization state of the incident beam 36 is preferably linear P-polarization with the field vector oriented along the X-axis 68 of the shown XYZ coordinate system, so that the X-axis is also referred to as the P-axis. The relative azimuthal orientation of the TR and LCD panel is defined by an angle $\phi_{rel}$ between the respective SAs 61 and 64, as shown in FIG. 14; it can also be described by an azimuthal angle between the TR SA 64 and the P-axis 68, as long as the azimuthal orientation of the LCD panel SA 61 is pre-defined along one of the preferred ±45 degree, or ±135 degree directions, i.e. along the bisectors of the S- and P-axes.

The combined polarization-changing effect of the TR/LCD assembly 22 for the incident beam 36 is equivalent to that of a single reflective retarder characterized by a net IPR magnitude $\Gamma_{net}$ and a net SA which is oriented between the SAs 61, 64 of the LC layer 203 and the TR 21.

Figure 4:
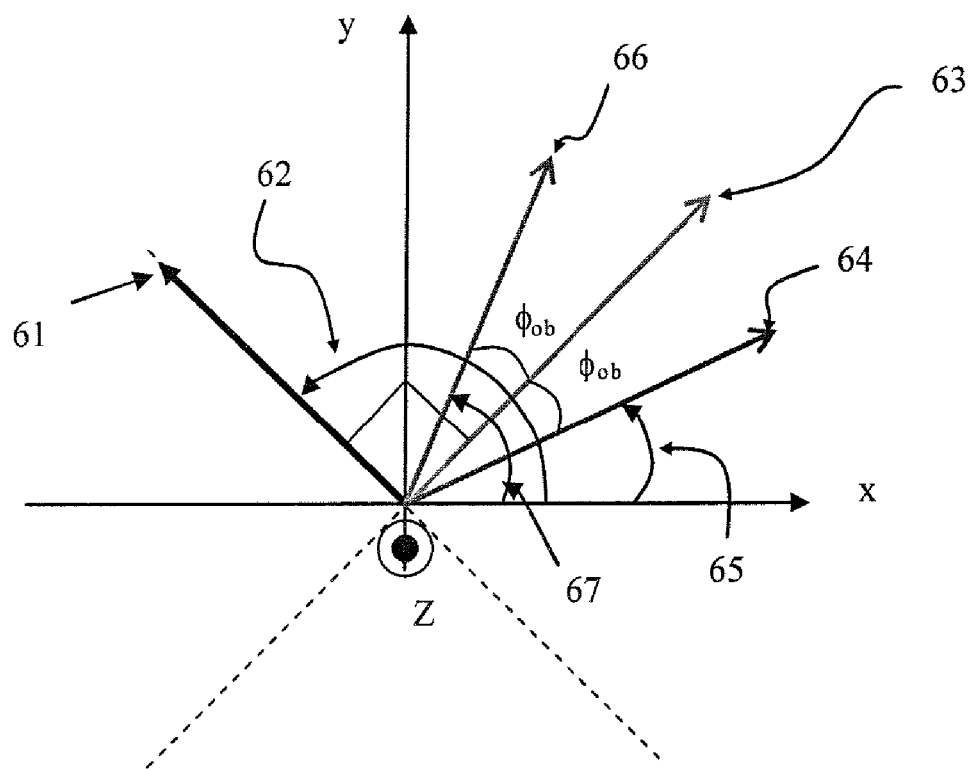
FIG. 4 is vector diagram illustrating generic relationships between A-plate components of a trim retarder and an LCoS and the system P-polarizer and S-analyzer.

The optimal mechanical clocking of the TR 21 corresponds to such a selection of the IPR ratio ($\Gamma_{TR}/\Gamma_{LC}$) for a given relative SA 64, 61 orientation, that the net SA of the TR/LCD assembly 22 oriented either along the P-axis 68 or orthogonally thereto for over-clocked orientation 66 in FIG. 4, in which configuration the P-polarized beam 36 will be reflected by the assembly 22 without any polarization change, despite possibly large net IPR $\Gamma_{net}$ of the assembly 22. The situation when the relative TR/LCD panel orientation is such that the polarization state of incident P-polarized light remains unchanged after passing through the TR/LCD panel assembly is referred to herein as the optimum compensation of the residual IPR of the respective LCD panel. For a given TR IPR $\Gamma_{TR}$ and a given $\phi_{rel}$, the LCoS IPR magnitude resulting in the optimal compensation is referred to herein as the target LCoS IPR $\Gamma_{target}$. An IPR compensation arrangement wherein orientation of the net SA of the TR/LCoS assembly deviates from its orientation, e.g. 69opt, of the optimal compensation is referred herein as a partial IPR compensation. To simplify the description, we will assume that the net SA 69opt is aligned along the P-axis in the optimal configuration rather than orthogonally thereto.

If the residual LC 203 IPR $\Gamma_{LC}$ is smaller than $\Gamma_{target}$ that is required for the optimal panel compensation for given $\Gamma_{TR}$ and $\phi_{rel}$, i.e. if x=($\Gamma_{target}$−$\Gamma_{LC}$)>0, the net SA of the assembly 22 is oriented away from the P-axis 68 towards the TR SA 64 at an angle $\phi_{over}$>0, as schematically shown by an arrow 69a; this retardance compensation arrangement is referred to herein as the over-compensation of the residual LC retardance by the TR 21, and the respective LCoS panel 20 is referred to as being over-compensated by x [nm]. The residual LC retardance can be increased by adjusting the dark-state LC voltage $U_d$ away from its nominal value $U_{dnom}$, e.g. increasing it if the LCD panel is a VAN-mode LCoS, whereby causing the net SA 69a to rotate towards the P-axis. The LC voltage $U_d > U_{dnom}$ at which the SA 69a is aligned with the P-axis 68 so that $\phi_{over}$=0 is used in the invention as the dark-state voltage in operation of the LCD panel assembly 22.

If the TR IPR is smaller, or the residual LCD panel IPR is larger than required for the optimal panel compensation for a given $\phi_{rel}$, the net SA of the assembly 22 is oriented away from the P-axis 68 towards the LC SA 61, as schematically shown by an arrow 69b; this is referred to herein as the under-compensation of the residual LC retardance by the TR. If the residual LC retardance refers to the dark-state IPR of the LC layer 203 at non-zero nominal LC voltage $U_{dnom}$, said IPR can be potentially somewhat decreased by reducing the VAN LC voltage U, so to lessen the combined effect of the LC and TR retardance on the polarization of the incident beam 36. However, the ability to lessen the dark-state IPR of an LCoS panel is limited by the available backplane voltage and a saturation of the $\Gamma_{LC}(U)$ dependence at low LC voltages.

Returning to FIG. 13, in one exemplary embodiment of the invention the TR wafer 91 is oriented so as to over-compensate all LCD panels with the residual IPR to the left of the IPR 105, which represents in this embodiment the target LC IPR $\Gamma_{target}$ for optimal compensation, and under-compensates LCD panels having the residual IPR to the right of the arrow 105. Since 105 is to the right of the nominal LC IPR $\Gamma_{nom}$ 102, which is herein assumed for simplicity to coincide with the maximum of the distribution 101, i.e. since $\Gamma_{target} > \Gamma_{nom}$, this orientation of the TR wafer 91 over-compensates the majority of the LCoS panels to which the distribution 101 relates. The step of non-mechanical tuning of the TR/LCD panel assembly, e.g. by adjusting the LC voltage, is then used in the present invention to minimize, or at least to substantially reduce to a suitable level, the effect of the residual LC retardance on the reflected beam. For example, for a given LCoS die on a given wafer, e.g. the LCoS die 84, the die-average IPR may be represented by point 106.

Figure 9:
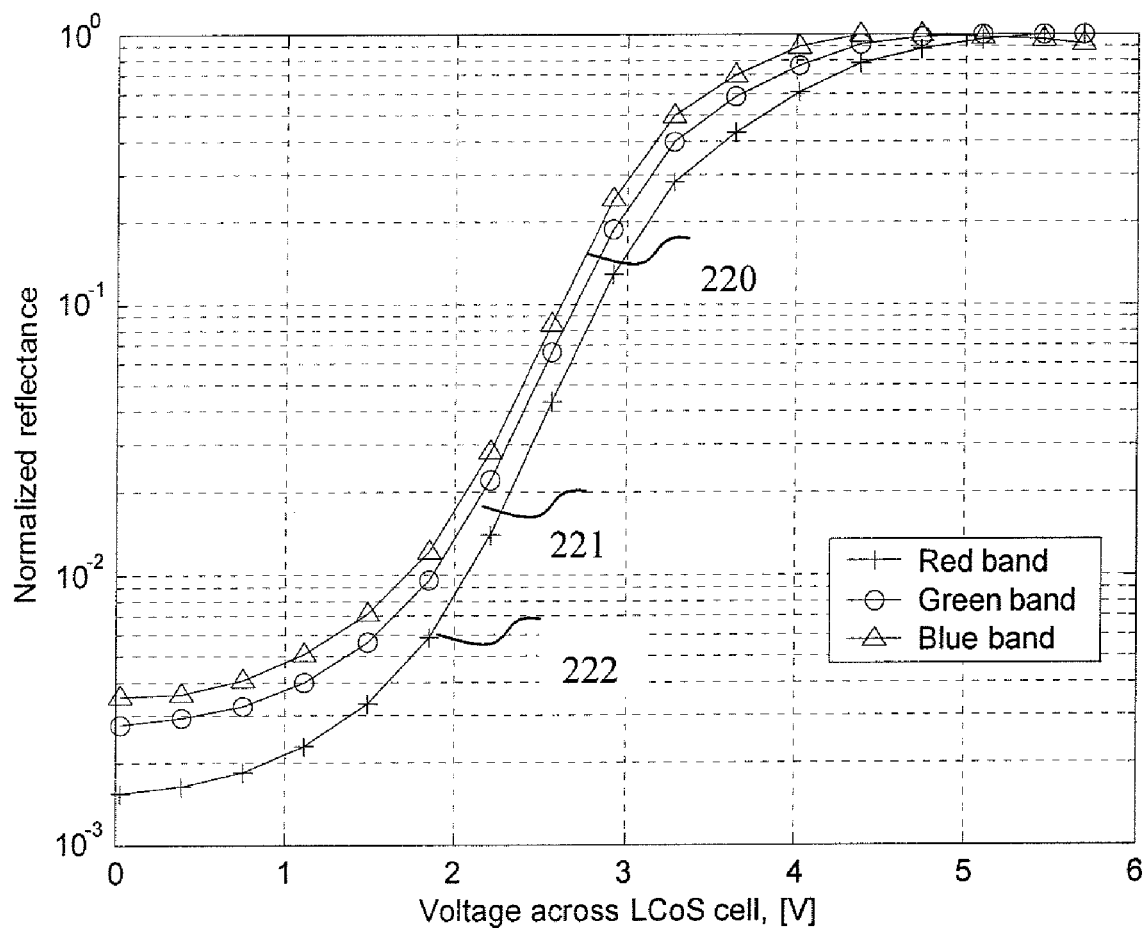
FIG. 9 is a graph showing measured EO characteristics of an uncompensated LCoS panel for the red, green and blue color bands.

The goal of the non-mechanical step of the present invention is to shift the in-plane retardance 106 of the LC layer 203 in the LCoS panel die 84 to the compensation target 105, as schematically shown by an arrow 107. By way of example, FIG. 9 shows an electro-optic (EO) response R(U) of a typical commercial VAN-mode LCoS panel, where R is the normalized LCoS cross-polarization reflectance:

$$R = Is/Ip \cdot (Ip/Is)_{max}, \quad (3)$$

where Ip and Is are the intensities of the incident p- and the deflected s-polarized beams 36 and 37, respectively, and $(Ip/Is)_{max}$ is a maximum value of the ratio (Ip/Is) across all LC voltages.

Figure 10:
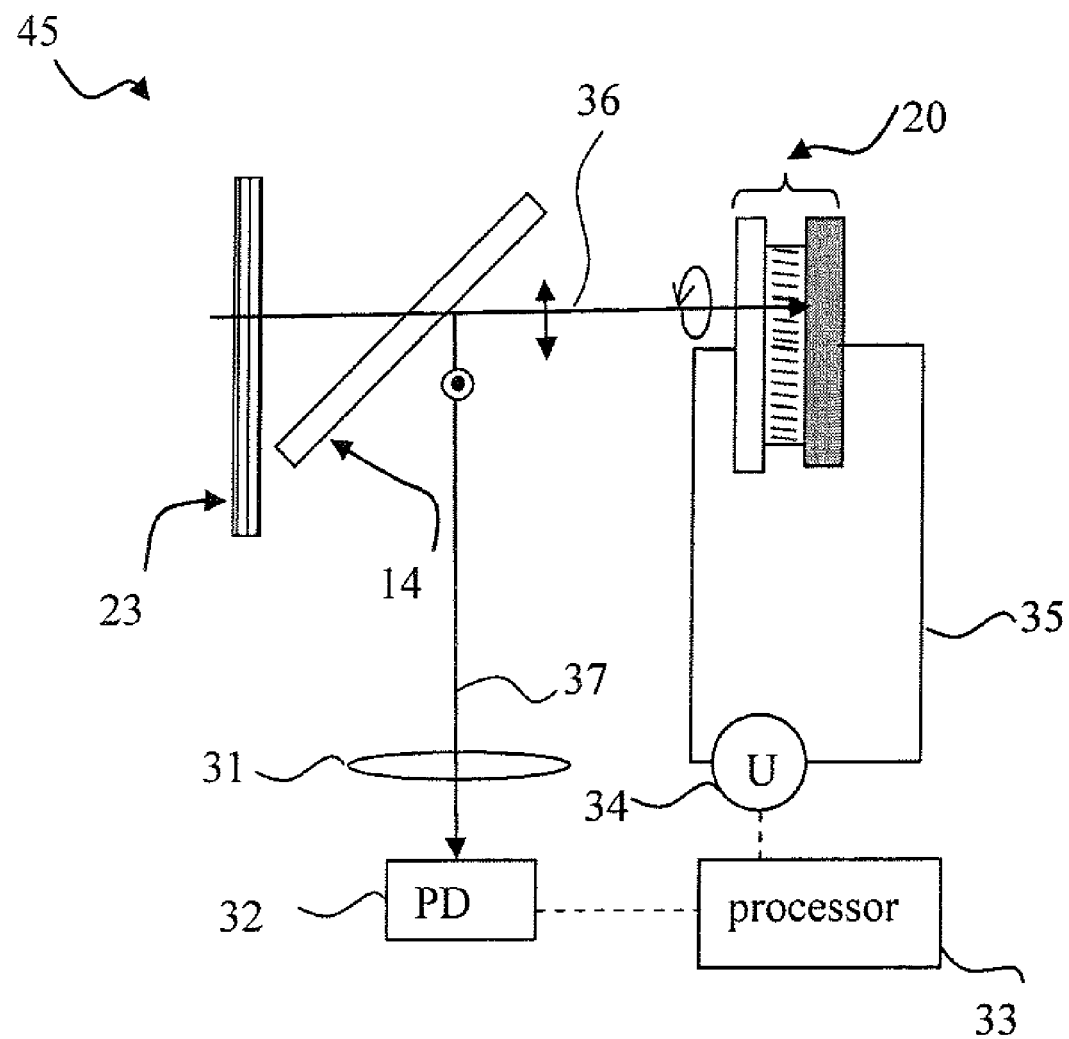
FIG. 10 is a schematic diagram of a measurement setup for determining EO characteristics of the LCoS panel.

The curves 220, 221 and 222 represent the R(U) characteristic for the blue, green and red color bands, respectively. The measurements were taken with an f/2.4 cone of illumination while varying the voltage U applied across the LC layer of the LCoS panel without utilizing a retarder compensator. The three primary color bands, Red, Green and Blue correspond to the wavelength ranges of the incident light of approximately 610 to 700 nm, 510 to 570 nm and 415 to 500 nm, respectively. The retro-reflection setup 45, which is schematically shown in FIG. 10, uses the WGP PBS 14 to first pass a P-polarized incident beam 36 towards the LCoS panel 20, and then to deflect a portion of the LCoS reflected beam which polarization was rotated by 90 degree by the LCoS device 20; the deflected S-polarized beam 37 is then collimated, or focused by a lens 31 upon a photodetector 32, which communicates a resulting electrical signal to a processor 33 that also generates signals for controlling the LC voltage U via a controller of the LCoS panel 20 schematically shown by a voltage generator 34. The EO LCoS characteristics 220-222 obtained using the set-up 45 correspond to a sequential contrast of the LCoS panel 21

$$CR = R(U_b)/R(U_d) \quad (4)$$

for either of the three primary color bands of at most several hundreds to one, corresponding to the normalized reflectance of a few tenths of a percent even in the completely voltage-off, i.e. $U_d = 0$, mode.

In equation (4), $U_d$ is the dark-, or off-state value of the LC voltage U, and $U_b$ is the bright-, or on-state value thereof. Ideally, they should provide a minimum and maximum values, respectively, of the normalized cross-polarization reflectance R(U) to maximize the contrast CR, which for the case shown in FIG. 9 would correspond to $U_d = 0$, and $U_b \approx 5V$, taking the Green color band by way of example. In practice, completely undriven off-, i.e. dark, state of an LCoS cell is an unlikely scenario for two reasons: i) the need to speed-up gray-level response results in a preference to have the off-state of the LCoS cell to be driven at non-zero sub-threshold voltage, i.e. at or immediately before the onset of a steep portion of the EO curves 220-222, and ii) the voltage swing magnitude that the Si backplane can provide is limited; for example, a typical 0.35 μm CMOS process delivers about 3.3-3.8V logic signals.

Figure 11:
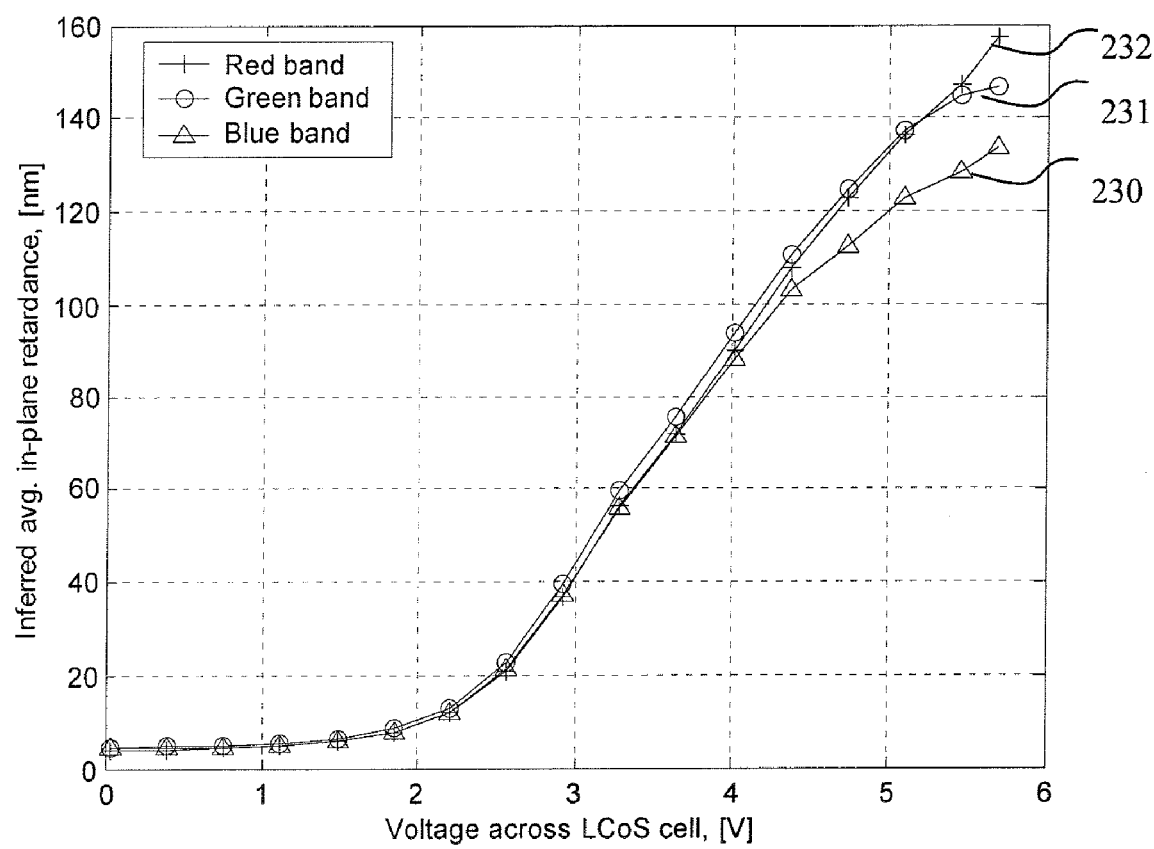
FIG. 11 is a graph showing RGB IPR of the VAN-mode LCoS panel inferred from the measured EO characteristics shown in FIG. 9.

FIG. 11 shows average IPR vs. LC voltage U, i.e. $\Gamma_{LC}(U)$, characteristics 230, 231, 232 of the uncompensated LCoS panel for the Blue, Green, and Red color bands, respectively, as inferred from the EO characteristics 220-222 of the LCoS cell using equation (1). In this example, the residual in-plane retardance of the VAN-mode LCoS cell is under 10 nm for sub-threshold voltage LC driving, U<2V. The inferred $\Gamma_{LC}(U)$ characteristics of FIG. 11 are used herein for illustrative purposes only; those skilled in the art will appreciate that possibly more accurate IPR(U) LCoS characteristics can be computed based on solving the energy minimization condition for LC elastic and applied electric force interactions using 1D, 2D or 3D numerical programs and with the knowledge of the LC material and dielectric parameters.

Figure 12:
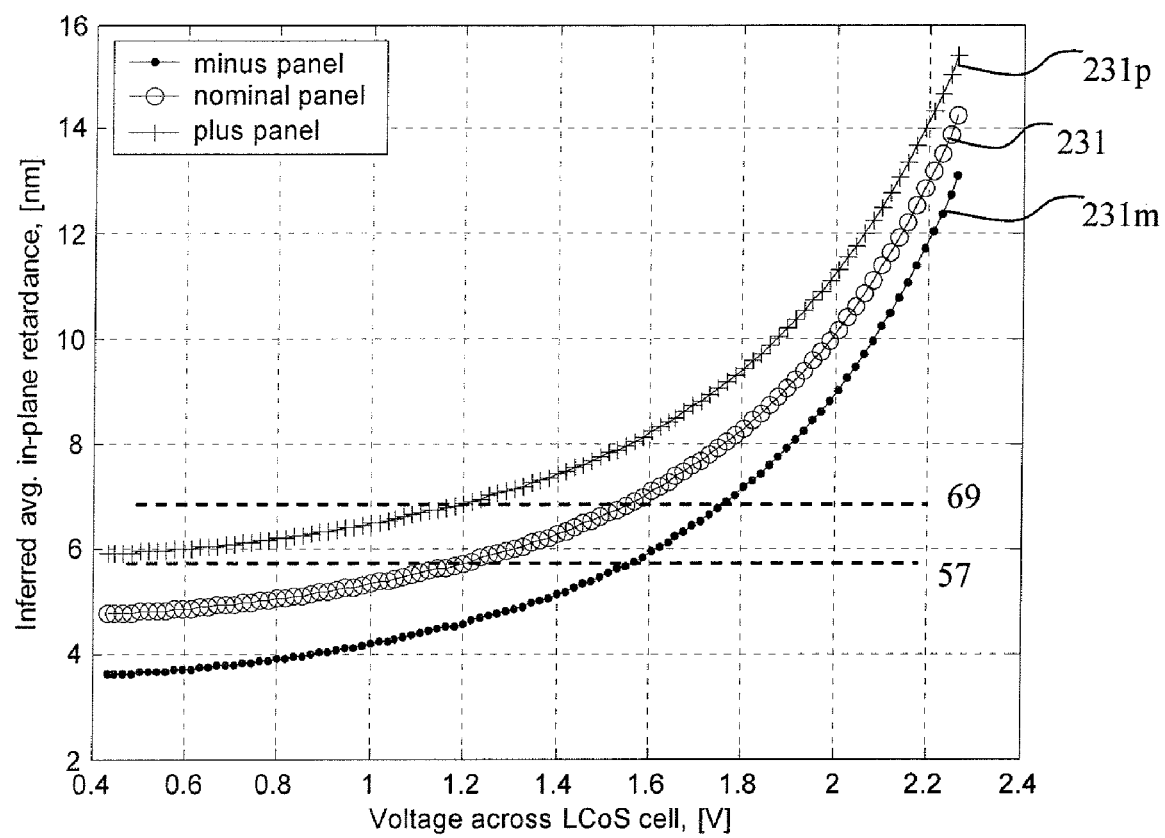
FIG. 12 is a graph showing the residual in-plane retardance vs. LC voltage for 'nominal', highest-retardance (plus panel) and lowest-retardance (minus panel) LCoS panels from a distribution of panels.

Hereinafter in the description, the invention will be illustrated referring to the green-band EO panel characteristics 221, 231 as an example, and the retardance characteristic 231 is assumed to be the nominal LCoS panel retardance corresponding to a maximum 102 in the distribution 101 of the residual IPR shown in FIG. 13, and also the IPR characteristic of the LC layer of the die 85 of the TR/LCoS assembly wafer 80 shown in FIG. 5. Also by way of example, LCoS dies 86 and 84 represent the plus and minus panels, respectively. FIG. 12 shows IPR characteristics 231p and 231m of the LC layers of the plus and minus panels 86, 84 in comparison with the IPR characteristic $\Gamma_{LC}(U)$ 231 of the 'nominal' panel 85. For practical consideration, $\Gamma_{LC}(U)$ voltage curves of all LCoS panels of a given design are confined between the characteristics 231p and 231m.

The step of TR/LCoS panel assembly tuning by adjusting the dark-state LC voltage will now be further described with reference to FIGS. 15-20, illustrating EO characteristics of the compensated TR/LCD panel assemblies 84-86 for differing relative azimuthal orientations of the TR and LCoS wafers 91, 81.

By way of example, the IPR of the TR wafer 91 is assumed hereinafter to be 10 nm and substantially constant across the wafer. The nominal bright-state voltage $U_{bnom} = 5V$, the nominal dark-state voltage is selected as $U_{dnom} = (U_{bnom} - V_{max}) = 1.2V$, where $V_{max} = 3.8V$ is assigned as the maximum swing voltage provided by the Si backplane circuitry.

Figure 15:
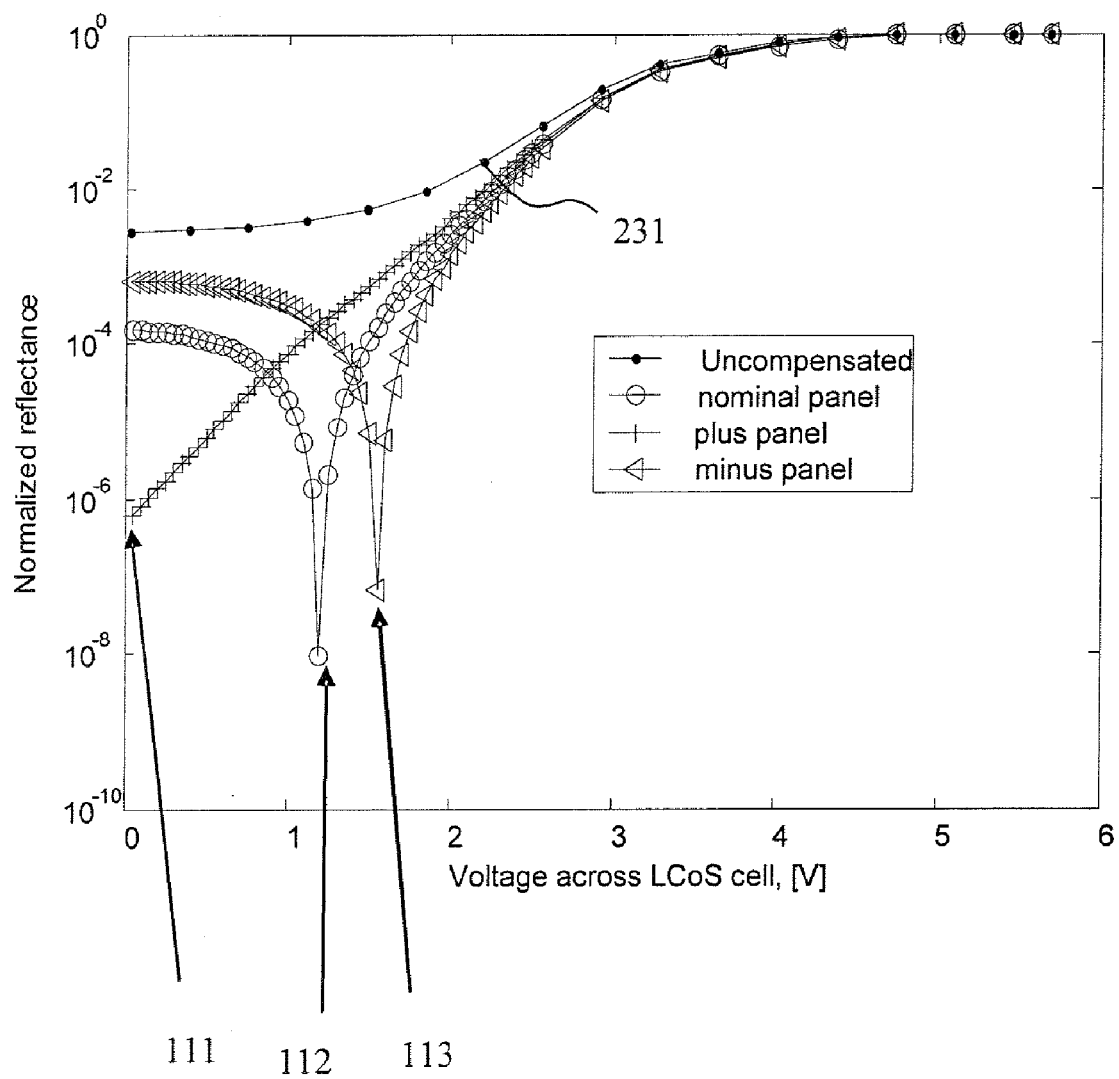
FIG. 15 is a graph showing EO characteristics for the three LCoS panels shown in FIG. 12 compensated with a TR mechanically clocked to the nominal LCoS panel at U=1.2V.

FIG. 15 illustrates the EO characteristics of the compensated TR/LCD panel assemblies corresponding to the dies 84-86 of the wafer 80 according to a first embodiment, wherein the orientation of the TR wafer 91 relative to the LCoS wafer 81 is selected so to optimally compensate the residual LC IPR of the nominal LCD panel 85 at the nominal dark-state voltage $U_{dnom} = 1.2V$. At 1.2V LC voltage, the nominal LCoS panel 85 shows approximately 5.7 nm of in-plane retardance at λ=550 nm, so that the target residual IPR in this case for optimal compensation is $\Gamma_{target} = 5.7$ nm. The required trim retarder slow-axis alignment for optimal compensation of the nominal panel is approximately 17 degrees from principal S and P axes, according to equation (2).

The EO profile 231 for the uncompensated nominal-panel 85 delivers 100 s to one contrast at best. The EO profile 112 of the nominal panel 85 shows a sharp notch at about 1.2V of applied voltage. This corresponds to the optimal point of the mechanical clocking for contrast optimization. Note that the extremely low crossed polarization leakage in the notch is a consequence of assumed approximations, when the non-ideal behaviour of crossed polarizers, panels, trim retarders and other optical element in the display optical system have not been yet accounted for.

Although the plus and minus panels 86, 84 at the nominal dark-state voltage of 1.2V have considerably higher reflectance R than the nominal panel 85, their contrast ratio can be improved by appropriately adjusting the dark state voltage. In fact, the optimal dark-state voltage for the minus-panel is about 1.55V, and corresponds to a minimum in the R(U) dependence 113. This means that the minus-panel 84, which has a 20% lower residual in-plane retardance at U=0 than the nominal panel 85, has to be driven harder in order to shift its off-state retardance to approximately 5.7 nm, which is illustrated in FIG. 12 by a horizontal line 57. Accordingly, the dark state voltage of the minus panel 84 is selected to be 1.55V. However, the plus panel is under-compensated, as is evident from its EO characteristics 111, and its contrast can only be improved by selecting the dark-state voltage below the nominal 1.2V value, which disadvantageously requires a simultaneous reduction in the on-state voltage $U_b$ because of the backplane voltage limitations.

Figure 16:
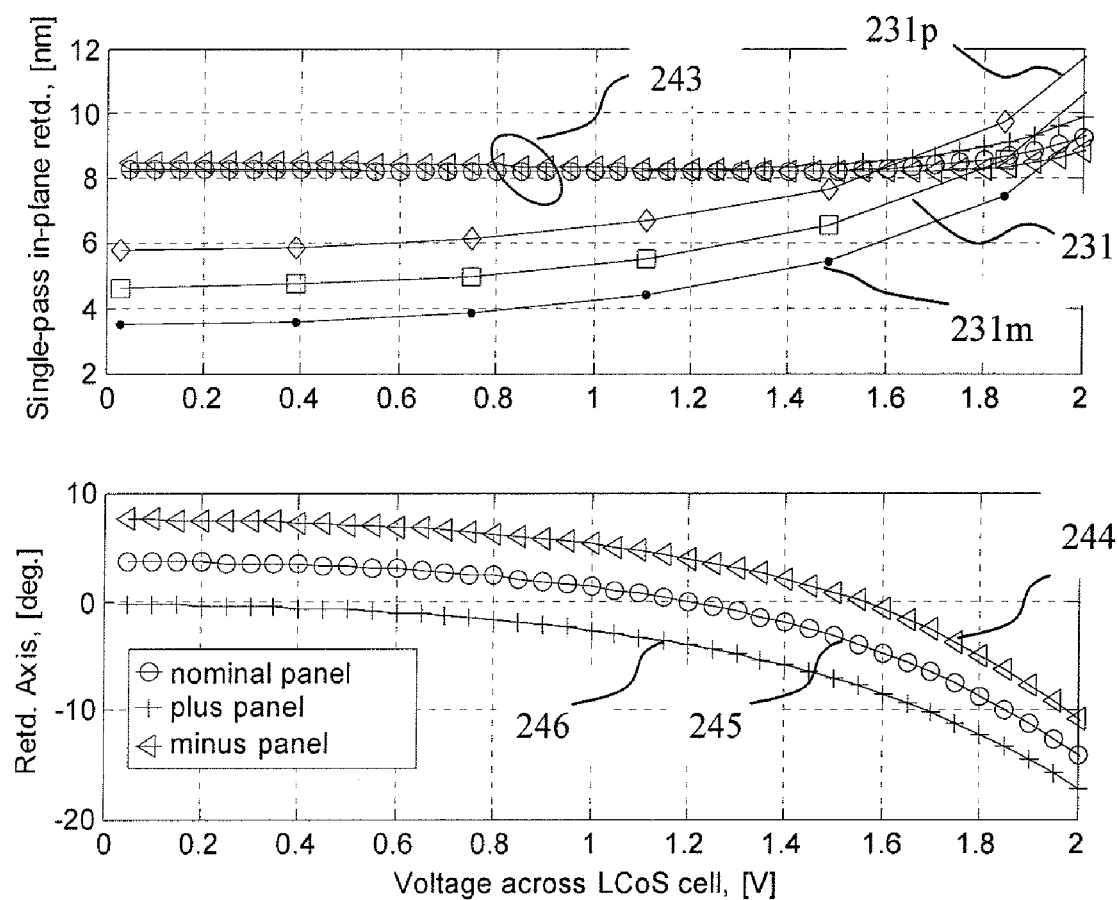
FIG. 16 is a graph showing net retardance characteristics for the three LCoS panels compensated according to FIG. 15.

FIG. 16 illustrates the voltage dependence of the net TR/LCoS assembly retardance 243 and the azimuthal angle 244-246 of the net SA for the TR/LCoS panels 84-86. The plots 231m, 231 and 231p show the uncompensated LC IPR of LCoS panels 84-86. Once a common trim retarder of 10 nm retardance is aligned at about 17 deg. off S axis 68 or the respective P-axis (FIG. 14), the resultant double-pass retardance $\Gamma_{net}$ of the three TR/LCoS assemblies lies between 8 and 10 nm for all driving voltages between 0 and 2V. The curves 244-246 show how the azimuthal angle between the net SA of each of the assemblies and the P-(or S-) axis changes with the applied LC voltage U. The optimum dark-state voltages for each of the panels, or notch locations in FIG. 15, correspond to points of intersection of the curves 244-246 with the zero angle axis. This figure illustrates that in order to minimize crossed polarization light leakage in the panel dark state, either the net in-plane retardance of the system has to approach 0 nm or the net retardation axis has to approach 0 or ±90 degrees with respect to the principal polarization axes in the optical system.

As stated hereinabove, it is typically easier to increase the LCoS IPR above it residual low-voltage value than to decrease it below said residual IPR value. Hence, in a preferred embodiment the TR wafer 91 orientation relative to the LCoS wafer 81 is selected to over-compensate the residual IPR of at least the majority, or preferably all the LCoS panels from the array 89. Moreover, it is further preferable to use TR wafers of a same nominal design and orientation to bond to different Si backplane wafers from the same batch of wafers, and from different batches. It may thus be preferable to select the nominal orientation of the TR wafer 91 to match the residual IPR of the plus panel, i.e. the panel having the largest expected residual retardance.

Figure 17:
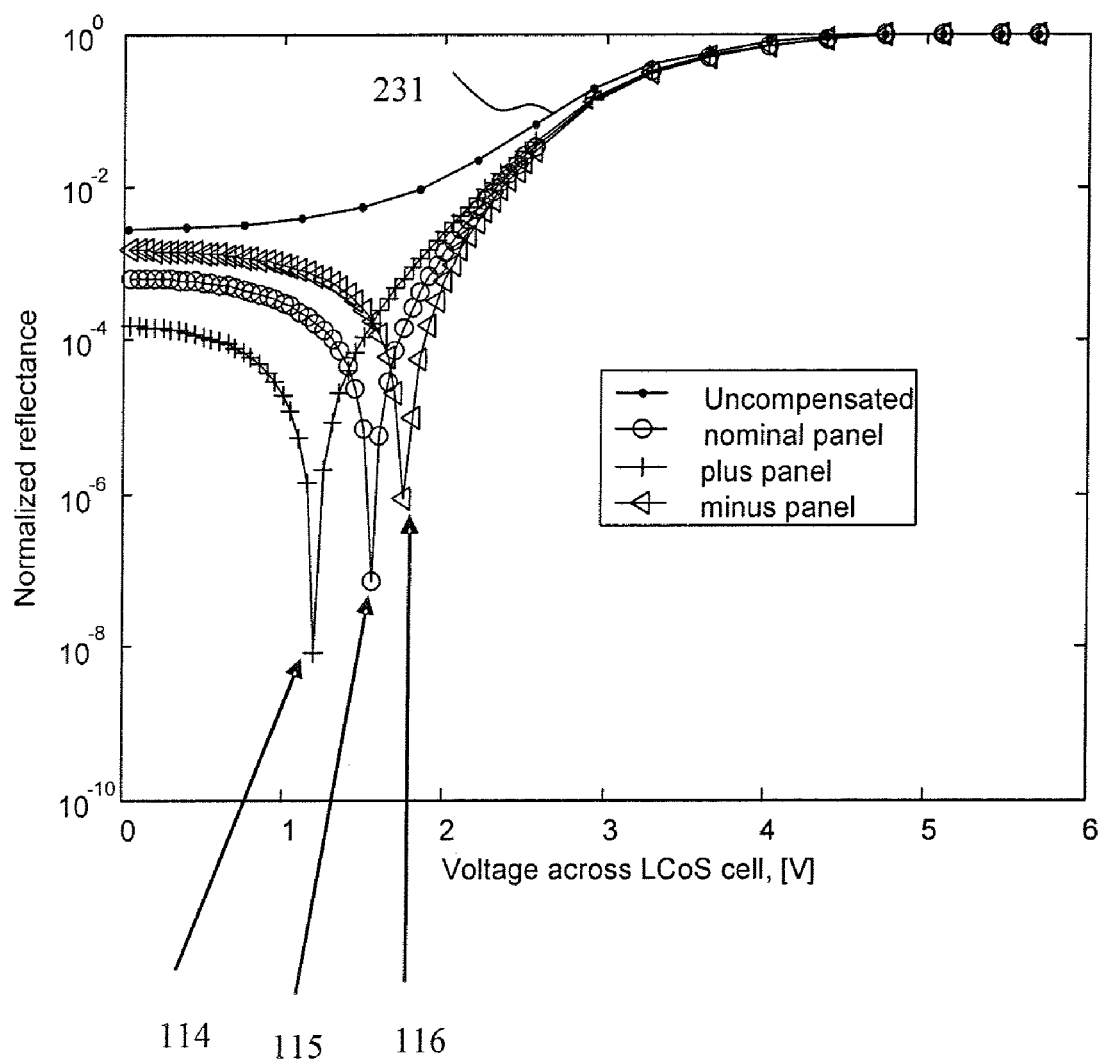
FIG. 17 is a graph showing EO characteristics for the three LCoS panels shown in FIG. 12 compensated with a TR mechanically clocked to the plus LCoS panel at U=1.2V.

FIG. 17 illustrates the EO characteristics of the compensated TR/LCD panel assemblies corresponding to the dies 84-86 of the wafer 80 according to a second embodiment, wherein the orientation of the TR wafer 91 relative to the LCoS wafer 81 is selected so to optimally compensate the residual LC IPR of the plus panel 85 at the nominal dark-state voltage $U_{dnom}$=1.2V. At 1.2V LC voltage, the plus LCoS panel 86 shows approximately 6.9 nm of in-plane retardance at λ=550 nm, so that in this case the target residual panel IPR $\Gamma_{target}$ for optimal compensation is 6.9 nm and exceeds $\Gamma_{nom}$=+5.7 nm. The required trim retarder slow-axis alignment for optimal compensation of the nominal panel is approx. 21 degrees from principal S or P axis, according to equation (2). With this starting point, all other panels have to be driven to a dark-state voltage higher than 1.2V and in each case, the LCoS IPR without the TR is shifted to approx. 6.9 nm, which is the plus-panel retardance at 1.2V. The optimal dark-state voltages correspond to minima 114, 115 and 116 in the R(U) characteristics of the compensated plus-, nominal- and minus-panels, respectively, and also to intersection points of the EO characteristics 231m, 231 and 231p of the respective un-compensated LCoS panels with a 6.9 nm retardance level 69 in FIG. 12; they are given, respectively, as $U_{d\,min}$=1.75V (minus panel), $U_{d\,nom}$=1.55V (nominal panel) and $U_{d\,plus}$=1.2V (plus panel). Dark-state retardance of practically all of other LCoS panels from the considered plurality of LCoS panels, up to the ±3σ probability levels, will have residual in-plane retardance between that of the plus and minus panels, and the corresponding integrated TR/LCoS panel assemblies will have therefore optimal dark-state voltages between 1.2V and about 1.75V, to which they can be tuned to enhance the contrast ratio CR. This example shows that, to ensure that the majority of TR/LCD panel assemblies can be optimally tuned for high contrast, the TR should be oriented so to over-compensate the nominal LCD panel retardance by at least 0.2 nm, or preferably at least 0.5 nm; in some cases an overcompensation by as much as 2-5 nm may be advantageous to increase yield. One skilled in the art will appreciate that the amount of overcompensation will vary from assembly to assembly and depend on the width of the LCoS IPR distribution 201 and the slope of $\Gamma_{LC}(U)$ characteristics 231.

Figure 2:
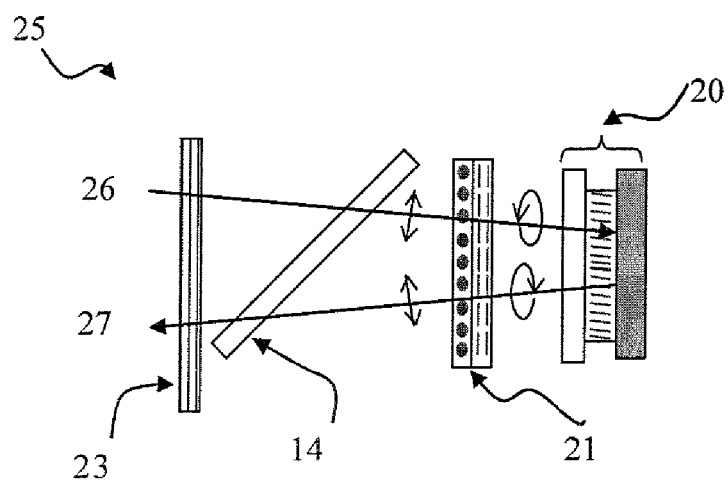
FIG. 2 is a side view of a single-channel LCoS imaging optics of the prior-art LCoS projection engine of FIG. 2.

In practice, the contrast ratio of an imager is further limited by light divergence, and non-ideal cross polarizers. Turning back to FIG. 2, the trim retarder element 21, inserted between the PBS 14 and the LCoS panel 20 also 'leaks' light through the crossed polarizers due to its non-zero reflectivity. Taken together, these non-ideal components limit the achievable contrast of a real optical imaging system. As an approximation, the system contrast CR(system) can be computed as, $$\frac{1}{CR(system)} \approx \frac{1}{CR(baseline)} + \frac{1}{CR(TR+panel)}, \quad (5)$$

where CR(system) is the expected real-system contrast, CR(baseline) is the contrast limit placed upon the system by the non-ideal optical components at the given cone illumination and CR(TR+panel) is the contrast associated with a double pass through the compensated TR/LCD panel assembly as determined by equation (4).

Figure 18:
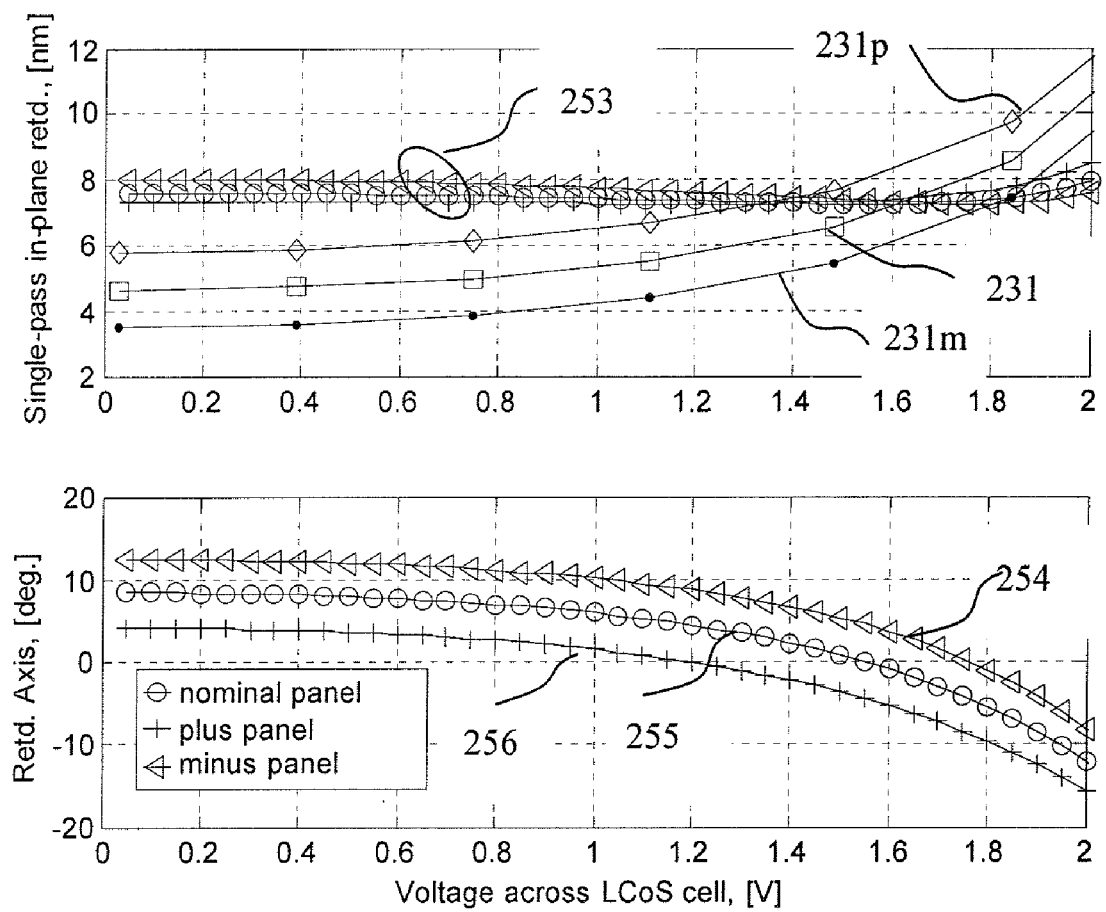
FIG. 18 is a graph showing net retardance characteristics for the three LCoS panels compensated according to FIG. 17.
Figure 19:
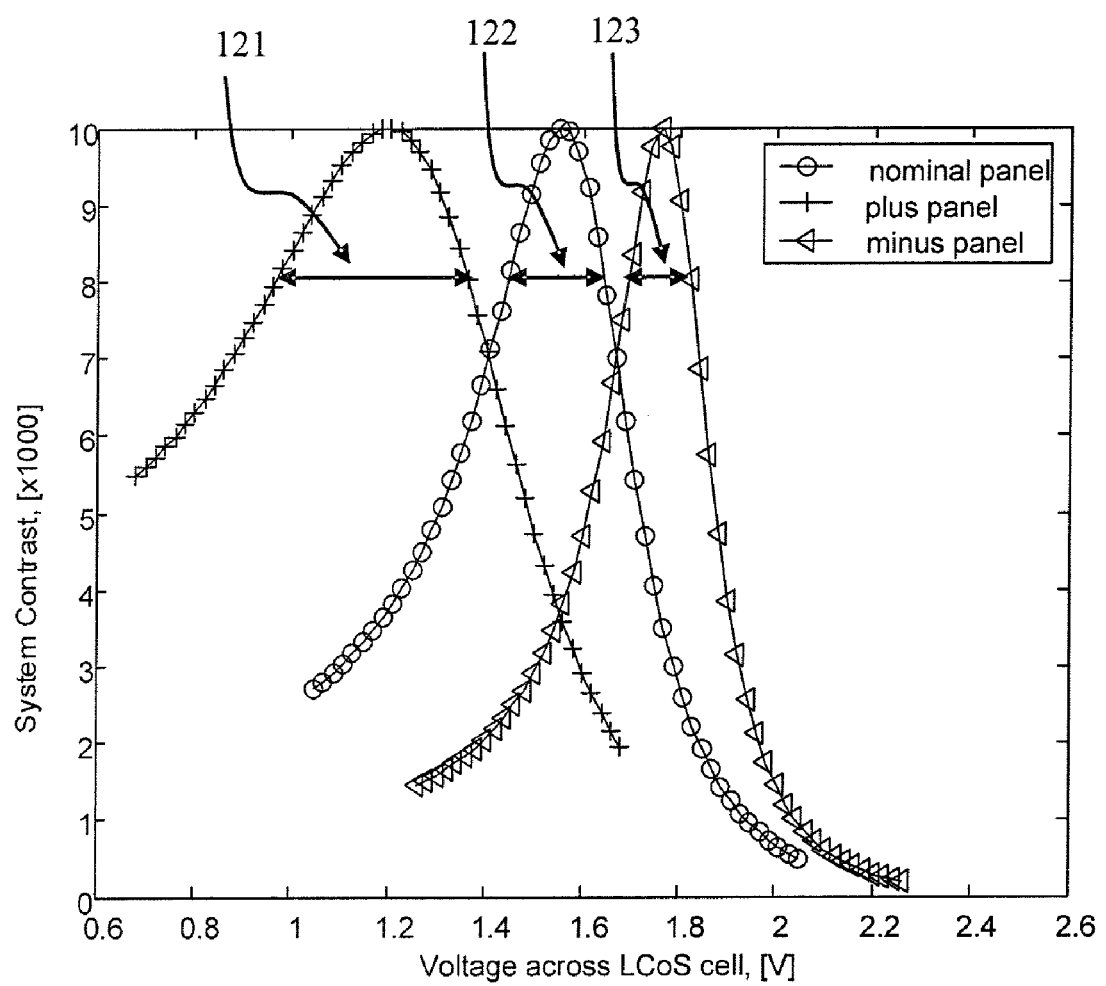
FIG. 19 is a graph showing simulated system contrast for the three LCoS panels compensated according to FIG. 17.

Curves shown in FIG. 19 illustrate the overall system contrast associated with the compensated plus, nominal and minus LCoS panels 86, 85 and 84 of the second embodiment described hereinabove with reference to FIGS. 17, 18, in dependence on the LC voltage U. The plus-panel, having the highest residual in-plane retardance at the lowest, 1.2V, optimal dark-state voltage gives the largest contrast bandwidth 121, relative to the corresponding contrast tuning curves of the nominal- and minus-panels. This is a result of the relatively flat EO curve 231p for the plus-panel at the lowest optimal voltage point. In FIG. 19, voltage ranges of 'acceptable' contrast, e.g. corresponding to at most 20% of contrast reduction compared to a peak value, are indicated by horizontal arrows 121, 122 and 123 for the plus-, nominal- and minus-panels, and range from about 0.4V to about 0.1V. For all three assemblies, and by inferences for TR/LCD assemblies based on all other LCD panels having retardance value between that of the minus- and plus-panels, the required granularity of the voltage tuning is ~0.1V, a requirement that can be easily met with an 8-bit digital to analogue conversion (DAC) of 3.3V CMOS backplane supply line. However, the narrowing of the contrast vs. LC voltage curve with increasing the dark state voltage may affect the preferred degree of the over-compensation when selecting the nominal TR wafer orientation and the target residual IPR magnitude according to the invention.

Figure 20:
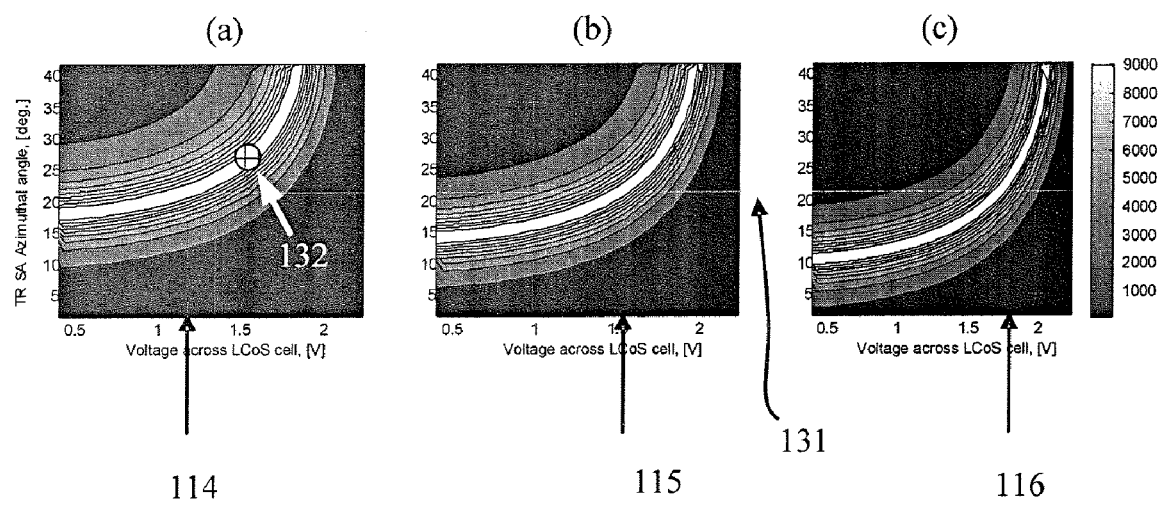
FIG. 20 is graph showing system contrast for the three LCoS panels compensated according to FIG. 17 vs. LC voltage and trim retarder slow axis alignment.

FIG. 20 is analogous to FIG. 19 in that it illustrate the system contrast sensitivity to TR/LCoS panel parameters, but presents contrast maps in two dimensions, the horizontal dimension being the LC voltage, and the vertical dimension being the azimuthal orientation of the local SA of the TR wafer 91 with respect to the x-axis, thereby accounting for possible spatial non-uniformity of the TR SA orientation in the wafer-level TR/LCoS assembly 80. Plots (a), (b) and (c) correspond to the plus-, nominal- and minus-panels, having the 10 nm IPR trim retarder oriented for optical compensation of the plus-panel at 1.2V dark-state LC voltage. Relatively brighter areas on the maps correspond to relatively higher system contrast. These maps illustrate that an optimal dark-state voltage Ud can be determined for each LCoS panel, or even for a grouping of LC cells in one LCoS panel if a local TR SA for a particular TR/LCoS panel assembly wafer deviates from its nominal orientation, which is 21 degrees in this particular case. For example, if a particular LCoS panel with the EO characteristic of the plus-panel is bonded to a TR wafer portion having a local SA oriented at 26 degrees azimuthal angle to the x-axis instead of the nominal 21 degrees, this local region contrast can be optimized by tuning the LC voltage of the respective LC cells to a new optimal contrast point 132. Accordingly, the contrast of a local region of the dual-stage trim retarder/LCoS system can be optimized by the voltage tuning step of the present invention even if the slow axis and retardance magnitude of both the trim retarder and LCoS in the local regions vary from the target values. This local region for which the dark-state LC voltage and, optionally, the bright-state LC voltage can be according to the invention optimized separately from other local regions may be a small group of pixels of one die of the TR/LCoS wafer 80 from the array 89 of TR/LCoS dies, a whole TR/LCoS assembly die, a group of LCoS die parts, an entire wafer of TR/LCoS devices etc.

Figure 21:
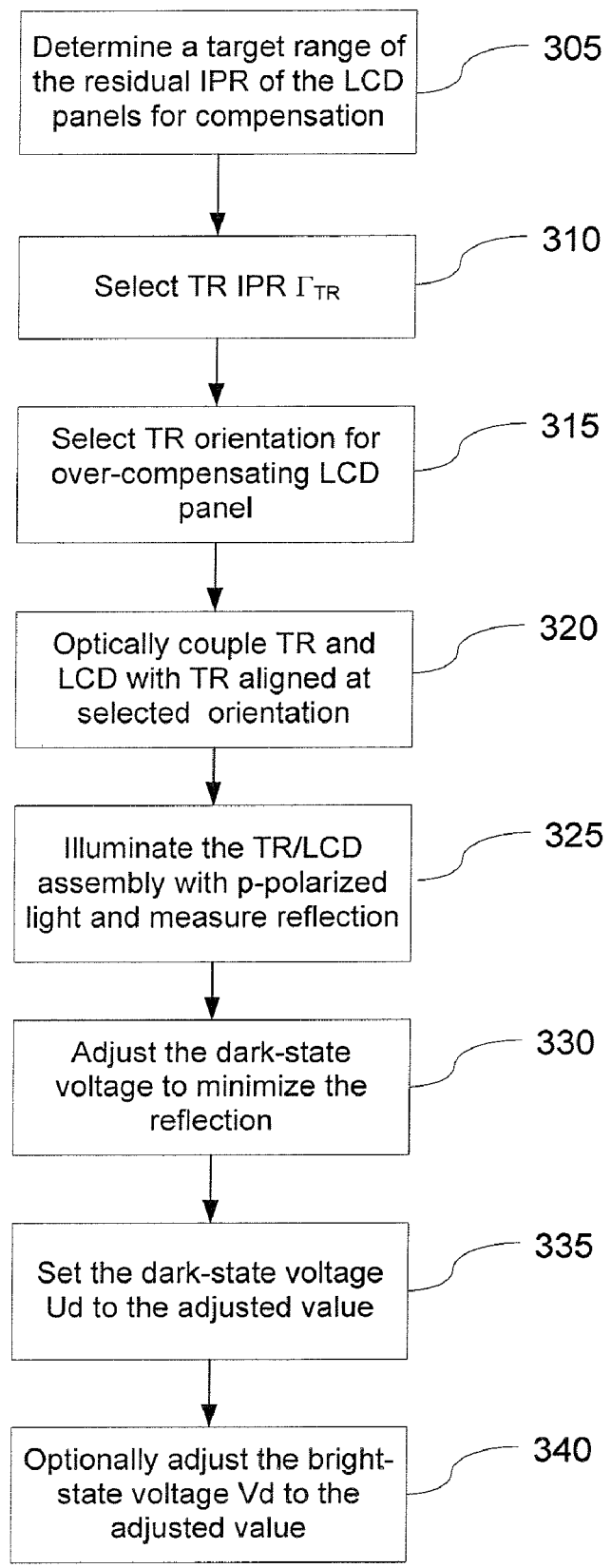
FIG. 21 is a flow chart of the method of the present invention for compensating the residual retardance of LCD panels.

Hereinabove the principles of the electronic contrast tuning by dark-state voltage adjustment according to the present invention have been described with reference to wafer-level manufacturing of the TR/LCoS assemblies wherein a plurality of LCoS panels are integrated with a plurality of trim retarders in the same technological step wherein the LCoS panels are produced. However, the method of the present invention is not limited to the wafer-level manufacturing of the TR/LCoS panel assemblies, and is applicable also to non-integrated assemblies wherein the TR and the LCD panel are manufactured separately and then are assembled together in a fixed predetermined relative orientation, which is the same for a large plurality of TR LCD panels pairs of a same nominal design. In this aspect of the invention, a method is provided for compensating, i.e. lessening the unwanted contrast-decreasing effect of the residual IPR of each LCD panel from a plurality of LCD panels, preferably but not exclusively of a same nominal design. In one embodiment, general steps of this method are illustrated in FIG. 21, and will now be described.

Figure 13:
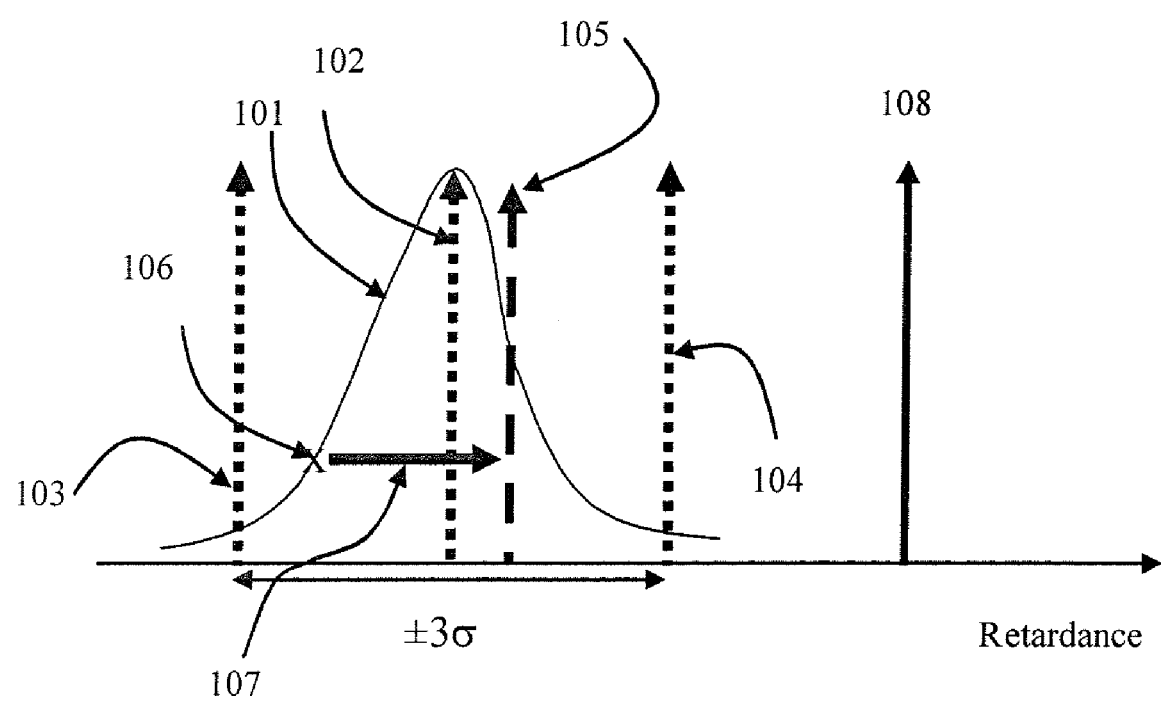
FIG. 13 is diagram illustrating the mechanical and non-mechanical steps of IPR compensation for a plurality of LCoS panels according to the present invention.

The method starts with step 305 wherein a target range of the residual IPR magnitudes to be compensated is determined, e.g. from an expected distribution of the residual panel IPR for a plurality of LCD panels; this can correspond, for example to the range between the ±3σ IPR magnitudes 103, 104 for the distribution 101 in FIG. 13; in some embodiments, it can be sufficient to determine only an upper limit $\Gamma_{LCmax}$ of the target range of the residual IPR magnitudes to be compensated.

In a next step 310, a TR compensator is selected with an IPR $\Gamma_{TR}$ greater than the residual IPR of any of the LCD panels to be compensated, i.e. with $\Gamma_{TR} > \Gamma_{LC\ res\ max}$;

In a next step 315, an azimuthal orientation of the TR compensator relative to an LCD panel that is being compensated, i.e. the angle $\phi_{rel}$ between their respective SAs, is selected so as to over-compensate, preferably by at least 0.2 nm, the residual IPR of said LCD panel for an incident beam of a pre-determined polarization, e.g. the linear P-polarization, as described hereinabove with reference to FIG. 14; this step may include selecting a target LCD IPR magnitude $\Gamma_{target}$ for optimal compensation by the TR that is greater than the residual IPR of the LCD panel; in one embodiment, $\Gamma_{target}$ is selected to be substantially equal to $\Gamma_{LCmax}$.

Figure 22:
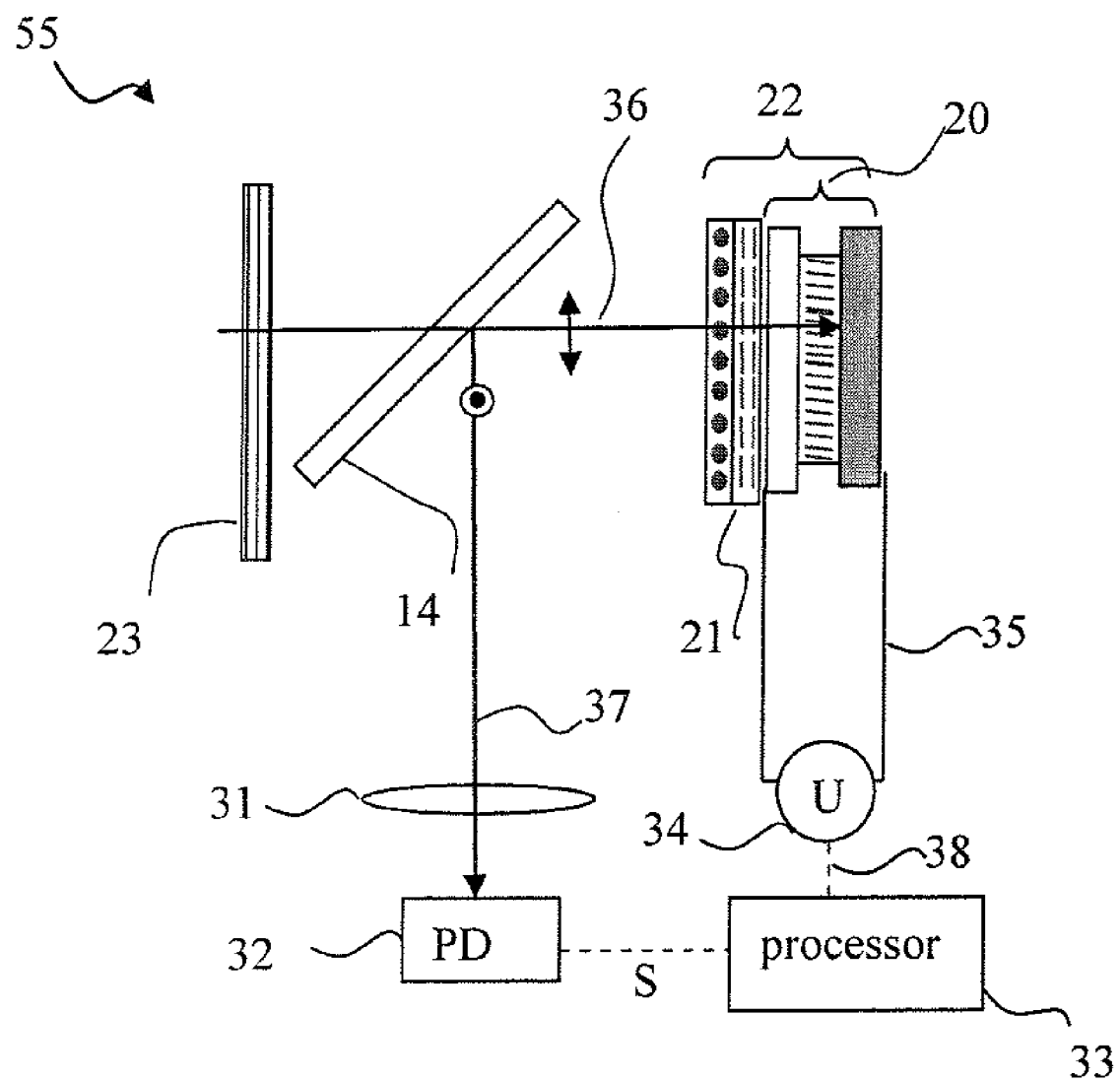
FIG. 22 is a diagram showing an LCD panel assembly calibration set-up for adjusting the dark-state voltage.

In a next step 320, the TR and the LCD panel are optically coupled in a fixed relative orientation selected in step 315, so as to form a pre-compensated TR/LCD panel assembly 22 for modulating the polarization of an incident P-polarized beam;

Next, the pre-compensated TR/LCD panel assembly 22 is placed in a measurement setup 55 schematically illustrated in FIG. 22 that includes many of the same elements described hereinabove with reference to FIG. 10, wherein like elements have like reference numerals.

In a next step 325, the light beam 36 having the pre-determined, e.g. linear P polarization is double-passed through the trim retarder 21 and the LC layer of the LCD panel 20 to obtain a reflected dark state beam, which is then passed to the WGP 14 that functions as a polarization analyzer, deflecting a filtered beam 37, wherein substantially only the S-polarized component of the dark-state beam remains, via the collimating or focusing optics 31 towards the photodetector 32, which measures the filtered beam intensity producing a feedback signal S that is proportional to the intensity of the filtered dark state beam 37, and indicates the degree of cross-polarization conversion of the incident beam 36 by the panel assembly 22. This signal S is communicated to the processor 33, which sends a control signal 38 to the voltage generator/LCD controller 34 for changing the LC voltage U of the LCD panel 20, and for providing to the LCD controller 34 information related to the beam 37 intensity for updating gamma correction tables.

In a next step 330, the feedback signal S is used by the processor 33 to adjust the LC voltage U so as to substantially minimize, or at least lessen the intensity of the filtered dark-state beam 37, thereby minimizing, or at least lessening the polarization-changing effect of the residual panel IPR for enhancing the sequential panel contrast CR. The adjusted value of the LC voltage U that minimizes the feedback signal from the photodetector 32 is then set in step 335 as the dark-state voltage $U_d$ of the LCD panel assembly 22; depending on a particular implementation of the LCD panel controller 34, this value can be either hard-coded or stored in memory of the LCD controller 34, as described hereinbelow.

In one embodiment, this step also includes varying the LC voltage U between the adjusted dark-state voltage $U_d$ and the bright-state voltage $U_b$ and while recording with the processor 33 the feedback signal S, and a resulting information characterising the shape of the adjusted EO characteristics R(U), e.g. in the form of a look-up table, is stored in the LCD controller 34.

Finally, in an optional step 340, the bright-state voltage of the LCD panel assembly 22 can be adjusted so as to maximize the feedback signal from the PD 32 in dependence on the LC voltage U, and the adjusted value thereof stored or hard-coded in the LCD panel controller 34 for use in the operation of the LCD panel assembly 22.

The aforedescribed general approach to LCD panel contrast enhancement by a fine-tuning of the dark-state and, optionally, bright-state LC voltage magnitudes can be realized for both analogue-driven and digitally-driven LCD panels. Analog driving of the LC pixels may utilise a single transistor at each pixel whereas the digital driving relies on pulse width modulation (PWM) of full-on (U=$U_b$) and full-off (U=$U_d$) pixels and may require multiple transistors per pixel, or LC cell. Each driving mechanism has its advantages and disadvantages in terms of optical image quality and electronic circuit design and layout trade-off.

Figure 23:
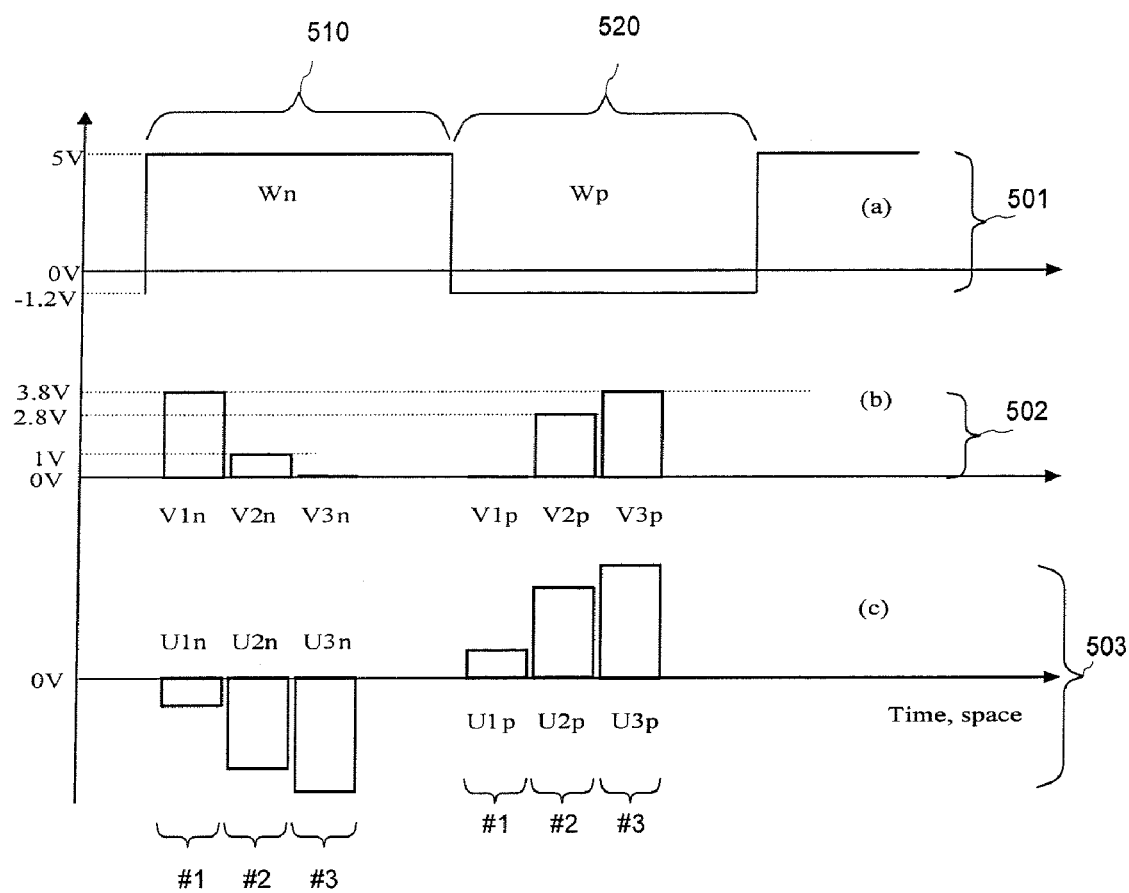
FIG. 23 is a diagram of exemplary voltage waveforms for addressing LC pixels of analog LCD panels.

FIG. 23 illustrates how the electronic dark-state polarization adjustment of the present invention can be realized for an analogue driven LCD panel with reference to voltage waveforms applied to an LC cell. Referring again to FIG. 6 showing a schematic diagram of the LC cell 200, the LC voltage U is defined by the difference between the ITO 204 voltage W and the Si backplane voltage, i.e. the voltage V on the reflective electrode 201:

$$U = V - W; \quad (5)$$

therefore, the LC voltage can be adjusted, or its signed can be reversed, by adjusting either the ITO voltage W, the backplane voltage V, or both. In the following, the backplane voltage V required to obtain the dark-state LC voltage $U_d$ is denoted as $V_d$, and the backplane voltage V required to obtain the bright-state LC voltage $U_b$ is denoted as $V_b$. As known in the art, the electrical field in the LC layer 203 has to be DC-balanced, such that there is no long-term electro-chemical degradation of the LC molecules. Hence, the LCD panel is typically driven so that a positive frame wherein U>0 is followed by a negative frame wherein U<0, and the dark and bright state voltages $V_d$ and $V_b$ will generally differ for the positive and negative frames; hereinafter the positive-frame dark-state and bright-state voltages are denoted as $V_{dp}$ and $V_{bp}$, respectively, while the negative-frame dark-state and bright-state voltages are denoted as $V_{dn}$ and $V_{bn}$, respectively.

In order to form the positive and negative voltage frames, it's common to fix the ITO 204 voltage W at mid-rail between the extreme voltage swings at the backplane mirror. This halves the effective applied electric field across the LC cell. There is limited backplane voltage available and hence it's not always possible to increase the supply rail voltages. An alternative LCD panel drive scheme can be utilized where the front ITO voltage W is toggled between a low, e.g. negative, voltage value and a high voltage value.

FIG. 23 shows the nominal voltage waveforms W(T) 501, V(T) 502 and U(T) 503 according to one embodiment of the current invention, which employs the toggling ITO analog drive scheme. The backplane voltage V varies between 0 and Vmax=3.8V as defined by the backplane CMOS driving circuitry. The nominal bright-, or on-state LC voltage $U_{bnom}$=5V is selected so as to maximize the cross-polarization P-S conversion of the incident light 36 by the compensated LCoS cell 200 of the assembly 22 (FIG. 22). The nominal dark-state LC voltage $U_{dnom}$ is then defined by the maximum available backplane voltage $V_{max}$=3.8V, as $U_{dnom}$=($U_{bnom}$−$V_{max}$)= 1.2V. These waveforms 501, 502, and 503 can be used to drive uncompensated LCoS panels, as well as a TR/LCoS panel assembly where the clocking angle is optimal at the required 1.2V dark state voltage, e.g. the compensated plus panel in FIG. 17.

Because the backplane supply rails for a given CMOS geometry cannot be increased appreciably, e.g. due to hot-electron degradation and drain punch-through effects at high saturation electric fields, the front ITO electrode voltage W has to swing a larger magnitude than the maximum backplane swing voltage $V_{max}$. In this analog addressing scheme example, a gray scale is created by charging the pixel capacitor to a voltage between 0 and 3.8V. The ITO electrode therefore toggles between $W_n$=5V during the negative frame 510 and $W_p$=−1.2V during the positive frame 520 in order that a dynamic range of 1.2V to 5V voltages be applied to each LC cell. The backplane waveform 502 illustrate addressing of three pixels, #1, #2 and #3, which are driven by the backplane voltages V1n,p, V2n,p and V3n,p such that they are in the same nominal dark state (U=±1.2V), grey state (U=±4V) and nominal bright state (U=±5V), respectively, during both the negative and positive frames 510, 520. The pixel ITO, backplane and LC cell voltages shown by the waveforms 501, 502 and 503, respectively, are also listed in Table 2. The nominal pixel addressing scheme is defined in this case by the following equations (6a)-(6f):

$$W_n = U_{bnom} \quad (6a)$$

$$W_p = -U_{dnom} \quad (6b)$$

$$V_{dn} = V_{max} \quad (6c)$$

$$V_{dp} = 0 \quad (6d)$$

$$V_{bn} = 0 \quad (6e)$$

$$V_{bp} = V_{max} \quad (6f)$$

TABLE 2

Pixel addressing voltages for nominal dark-state and bright-state voltages.

| Quantities, | Negative Frame | | | Positive Frame | | |
|---|---|---|---|---|---|---|
| (Volts) | Pixel #1 | Pixel #2 | Pixel #3 | Pixel #1 | Pixel #2 | Pixel #3 |
| ITO Voltage, W | 5.0 | 5.0 | 5.0 | −1.2 | −1.2 | −1.2 |
| Backplane Voltage, V | 3.8 | 1.0 | 0 | 0 | 2.8 | 3.8 |
| Voltage across LC, U | −1.2 | −4.0 | −5.0 | 1.2 | 4.0 | 5.0 |

When the pre-compensated LCoS panel assembly 22, or a group of pixels therein, is not optimally clocked in at the nominal dark-state voltage $U_{dnom}$, the voltage tuning step 330 is employed for enhancing the sequential pixel contrast CR for the LCoS assembly or the group of pixels concerned. By way of example, the new adjusted dark-state LC voltage $U_d$ determined in step 330 is 1.5V vs. the nominal 1.2V.

First, we will consider an embodiment wherein the dark state LC voltage $U_d$ is adjusted by appropriately adjusting the ITO toggle voltage W. This embodiment is illustrated in Table 3, which lists the voltages V, W at the backplane and ITO electrode as well as the LC voltage U that are required to drive the three pixels to the adjusted dark state, the grey state and the bright state, similarly as in table 2. In this example, the positive-frame value $W_p$ of the ITO toggle voltage W is adjusted to match in value the increased dark-state LC cell voltage $U_d$=1.5V, i.e. $W_n$=−1.5V. The dark-state backplane voltage in the positive frame V1$p$ is unchanged but its negative frame voltage V1$n$ is adjusted by the same amount as the ITO voltage adjustment. Also by way of example, the gray-level pixel has to be driven to a new LC voltage U=4.2V vs. 4.0V previously, but the full-bright voltage $U_b$ remains at 5V. The adjusted pixel addressing scheme is defined in this case by the following equations (7a)-(7f):

$$W_n = U_{bnom} \tag{7a}$$

$$W_p = -U_d \tag{7b}$$

$$V_{dn} = (U_{bnom} - U_d) \tag{7c}$$

$$V_{dp} = 0 \tag{7d}$$

$$V_{bn} = 0 \tag{7e}$$

$$V_{bp} = (U_{bnom} - U_d) \tag{7f}$$

TABLE 3

Pixel addressing voltages for adjusted dark-state and nominal bright-state voltages. The negative frame ITO voltage $W_n$ is changed by the amount of the dark-state LC voltage adjustment.

| Quantities, | Negative Frame | | | Positive Frame | | |
|---|---|---|---|---|---|---|
| (Volts) | Pixel #1 | Pixel #2 | Pixel #3 | Pixel #1 | Pixel #2 | Pixel #3 |
| ITO Voltage, W | 5.0 | 5.0 | 5.0 | −1.5 | −1.5 | −1.5 |
| Backplane Voltage, V | 3.5 | 0.8 | 0 | 0 | 2.7 | 3.5 |
| Voltage across LC, U | −1.5 | −4.2 | −5.0 | 1.5 | 4.2 | 5.0 |

Next, in another embodiment the voltage tuning steps 330, 340 of the current invention are implemented using an alternative pixel addressing scheme, which may involve fixing the toggling ITO voltages $W_n$, $W_p$, while changing the dark-state backplane mirror voltages $V_d$ in both the positive and negative frames. Table 4 lists relevant pixel voltages in this embodiment for the same three-pixel configuration as described hereinabove with reference to FIG. 23 and Tables 2, 3. The adjusted pixel addressing scheme is defined in this case by the following equations (8a)-(8f), with fixed ITO voltages $W_n$, $W_p$:

$$W_n = U_{bnom} \tag{8a}$$

$$W_p = -U_d \tag{8b}$$

$$V_{dn} = (U_{bnom} - U_d) \tag{8c}$$

$$V_{dp} = (U_d - U_{dnom}) \tag{8d}$$

$$V_{bn} = 0 \tag{8e}$$

$$V_{bp} = (U_{bnom} - U_d) \tag{8f}$$

TABLE 4

Pixel addressing voltages for adjusted dark-state and nominal bright-state voltages. The ITO voltage W is unchanged.

| Quantities, | Negative Frame | | | Positive Frame | | |
|---|---|---|---|---|---|---|
| (Volts) | Pixel #1 | Pixel #2 | Pixel #3 | Pixel #1 | Pixel #2 | Pixel #3 |
| ITO Voltage, W | 5.0 | 5.0 | 5.0 | −1.2 | −1.2 | −1.2 |
| Backplane Voltage, V | 3.5 | 0.8 | 0 | 0.3 | 3.0 | 3.8 |
| Voltage across LC, U | −1.5 | −4.2 | −5.0 | 1.5 | 4.2 | 5.0 |

Tables 3 and 4 demonstrate that method of the present invention requires that the control and driving circuitry of the LCD panel provides means for adjusting either the dark state voltage $V_d$ at the backplane electrode during the positive and negative frames, or the ITO voltages W, or both. For a digital addressing scheme employing PWM for gray scale dithering, only the full-on, i.e. dark, and full-off, i.e. bright, pixel states are relevant. The bipolar LC cell voltages of pixel #1 and #3 from Tables 3 and 4 show the required voltage waveforms. Backplane pixel driving circuitry that provides the capability to adjust the dark-state is backplane voltage $V_d$ is known in the art, see e.g. US Patent Applications 2004/0070562 assigned to eLCOS Microdisplay Technology, Inc, which is incorporated herein by reference.

Figure 24:
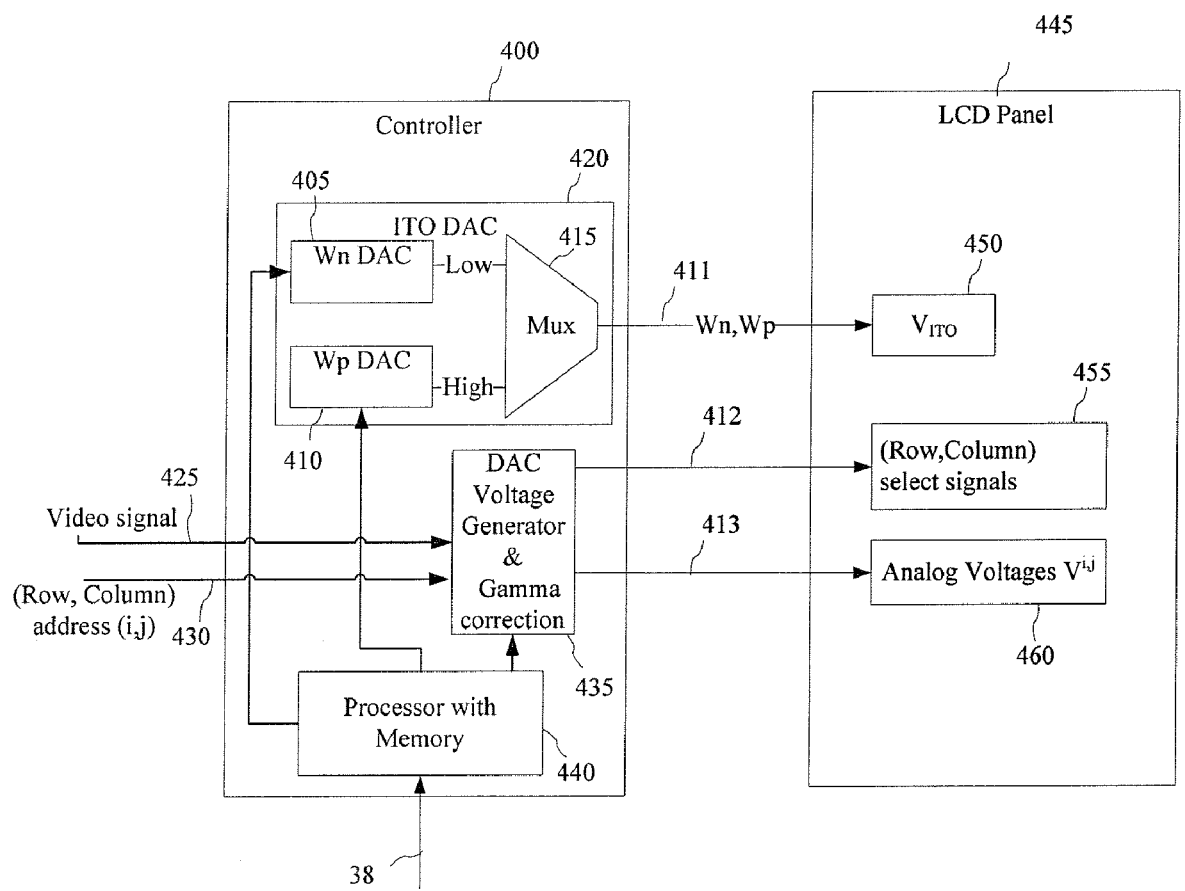
FIG. 24 is a block diagram of LCD control circuitry.

FIG. 24 provides an example of the electrical control architecture of an LCD panel assembly 22 with adjustable dark-state LC voltage Ud according to the present invention. The pixel addressing and control circuitry is divided between the LCD panel 445 and the controller board 400, hereinafter referred to as the controller 400. The LCD panel 445 comprises the LCoS panel 20 of the compensated TR/LCD assembly 22, and includes ITO voltage terminal 450, backplane voltage terminal 460 and terminal 455 for receiving pixel select signal 412. The controller 400 includes an ITO voltage generator 420 which connects to the ITO voltage terminal 450, and the backplane voltage generation and gamma correction block 435 which connects to the backplane voltage terminal 460. The ITO voltage generator 420 includes two DACs 405 and 410 for generating the ITO voltages $W_n$ and $W_p$ for the negative and positive frames, which are supplied to a multiplexer 415. The multiplexer 415 provides to the ITO terminal 450 a voltage signal 411 that switches between $W_p$ and $W_n$ according to the current frame.

The backplane voltage generator 435 receives a video signal 425 including pixel brightness information, and an accompanying address signal 430 defining pixel address or addresses in the LCD panel 445 to which the video signal pertains. In response to these signals, the backplane voltage generator 435 generates analogue backplane voltages $V^{i,j}$, wherein the superscripts 'i,j' define the pixel row and column addresses as designated by the address signal 430, using pre-determined dark-state and bright-state backplane voltages $V_d$, $V_b$ for the positive and negative frames, and gamma-correction tables for scaling grey-scale voltages $V^{i,j}$ to account for the nonlinearity of the EO characteristic of the LCD panel and the desired human visual response.

The controller 400 includes a processor/memory module (PMM) 440, which can be embodied e.g. using an FPGA and which includes memory for storing the dark-state and bright-state backplane voltage values and gamma-correction tables, which are then provided to the backplane voltage generator 435. Optionally, the PMM 440 can also process and store the ITO voltage values $W_n$ and $W_p$, and provide them to the ITO voltage generator 420.

In one embodiment, the PPM 440 stores the default nominal dark-state and bright-state LC voltage values $U_{bnom}$ and $U_{dnom}$ and a nominal gamma-correction table for a selected color band, and computes the ITO voltages $W_n$, $W_p$ and of the backplane voltages $V_{dn}$, $V_{dp}$, $V_{bn}$, $V_{bp}$, e.g. using equations (6a)-(6f). Turning back FIGS. 21 and 22, the dark-state LC voltage is adjusted in step 330 of the method of the current invention using the external signal 38 until the feedback signal S is minimized or lessened to a suitably low level; the hereby obtained new adjusted dark-state voltage $U_d$ is stored in the PMM 440, and is used therein to compute the respective backplane and, optionally, ITO voltages, e.g. on the basis of equations (7a)-(7f) or (8a)-(8f), or the like. Additionally, the default grey-scale gamma-correction table is updated for the new voltage settings as determined during the calibration step 330. The updated backplane voltages, gamma correction coefficients, and optionally ITO voltages if updated, are provided to the voltage generator 435 and, optionally, to the ITO voltage generator 420.

The description hereintofore was focused primarily on embodiments wherein the dark state and bright state voltages are defined and updated as required for a whole LCD panel, so that a pixel with coordinates (i,j) is driven by a same set of voltages in response to a same video signal for regardless of the pixel location in the display, i.e. regardless of the pixel's coordinates i,j. However, this may result in the contrast ratio non-uniformity across the LCD panel assembly 22, due to spatial non-uniformity of retardance characteristics of the TR 21 and of the LC layer of the LCD panel 20. Turning back to FIG. 5, spatial non-uniformity of the LCoS panel 81 IPR, and to a lesser extent of the TR wafer 91 will generally result in a non-uniform degree of the residual IPR compensation across each LCD panel die from the array 89 of the TR/LCoS wafer 80.

Therefore, another aspect of the invention provides a method for electronic tuning of the contrast ratio uniformity of a TR/LCD panel assembly by individually adjusting the dark-state LC voltage Ud for different spatial groupings of LC pixels of the LCD panel, and a sectionalized LCD panel assembly adopted for practicing said method.

Figure 25:
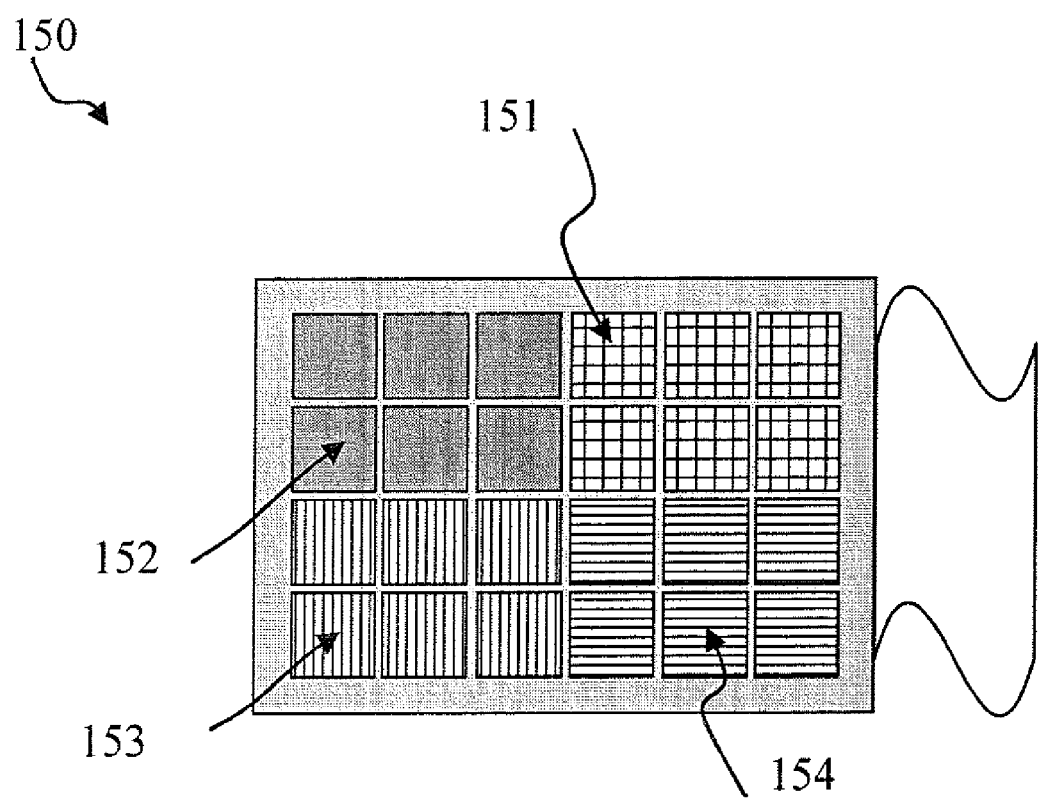
FIG. 25 is a schematic plane view of a sectionalized LCD panel assembly.

FIG. 25 illustrates an integrated TR/LCD panel assembly 150 wherein the TR element, which is transparent and not visible in the figure, is oriented for at least partially compensating the polarization-changing effect from the residual in-plane retardance of the underlying LCD panel for a P-polarized light beam, as described hereinabove e.g with reference to FIGS. 5 and 14. The assembly 150 can be fabricated e.g. using the aforedescribed wafer-level manufacturing of the TR/LCD assemblies illustrated in FIG. 5. In the exemplary embodiment shown in FIG. 25, the LCD panel of the assembly 150 is sectionalized in 4 sections, or quadrants 151, 152, 153 and 154, each comprising spatial groupings of pixels represented by differently shaded squares. In operation each of said groupings of pixels is driven by a voltage waveform, e.g. as illustrated in FIG. 23 and tables 2-4, associated with a distinct dark-state voltage $U_d(k)$, $k=1, \ldots 4$, that is different from respective dark-state voltages for the other groupings of pixels, e.g. $U_d(k1) \neq U_d(k2)$ if $k1 \neq k2$, so as to improve spatial uniformity of a resulting image contrast in comparison with an image contrast resulting from using a same dark-state voltage for each of said groupings of pixels. In other embodiments, the number of sections N can be smaller or greater than 4. The distinct dark-state voltages can be determined using the method of the present invention as described hereinabove with reference to FIGS. 21 and 22, in which step 325 is performed using spatially resolved measurements. For example, the dark-state voltage $V_d(1)$ for the section 151 can be determined shielding the sections 152-154 from the light beam 36 with a non-reflecting screen while allowing the light beam 36 to impinge upon the section 151, while adjusting the LC voltage uniformly applied to the pixels of the section 151 until the feedback signal S is minimized. Alternatively, the beam 36 can be configured by other known in the art means so that its spot size at the LCD panel does not exceed one section thereof, and then mechanically shifting the LCD panel assembly 22 so as to illuminate different sections thereof.

The set of N dark-state voltages $V_d(k)$ is then provided to the LCD voltage controller 38 for storing therein, and for generating voltage waveforms associated with said dark-state voltages, including grey-level voltage waveforms.

One skilled in the art will realize, that different LCD voltage control and pixel addressing schemes can be employed for driving the sectionalized LCD panel assembly 150. By way of example, in one embodiment the LCD panel of the assembly 150 is analogue-driven, and includes a uniform non-pixelated and non-sectionalized ITO layer. In this embodiment, the general architecture of the controller board 400 shown in FIG. 24 can be used for driving the sectionalized LCD assembly 150, with suitable changes to the PMM 440 and the backplane voltage generator 435. The PMM 440 stores the set of N dark-state voltages $V_d(k)$, and, optionally, bright-state voltages $V_b(k)$, and also N look-up tables for grey-level gamma correction obtained during the characterization step 330. This data is delivered to the backplane voltage generator 435, which selects one of said N gamma correction tables in dependence on the pixel address signal 430 to perform gamma correction of the video signal 453, so that a video signal addressed to a pixel in e.g. section 153 is gamma-corrected using the associated gamma-correction table and the associated dark-state voltage $V_d(3)$. In this embodiment, the pixel addressing scheme wherein the ITO voltage values Wn and Wp are fixed, which is descried hereinabove with reference to table 4 and equations (8a)-(8f), can be used to set individual dark-state voltages for the sections 151-154.

Figure 26:
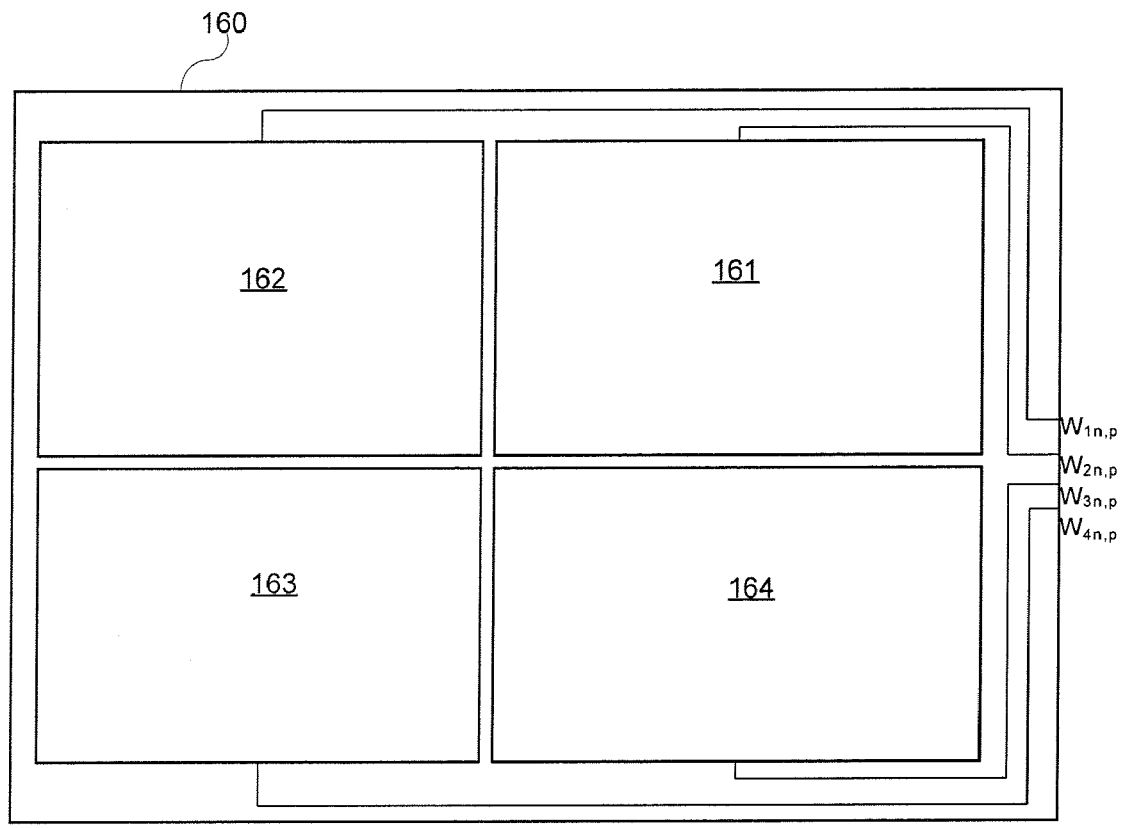
FIG. 26 is a diagram of a sectionalized ITO electrode.

With reference to FIG. 26, in another embodiment the ITO electrode 160 of the LCD panel assembly 150 is sectionalized in four individually-driven sections 161-164 overlapping with the LCD panel sections 151-154. In this case, the pixel-addressing scheme described hereinabove with reference to Table 3 and equations (7a)-(7f) can be utilized. In this embodiment, the controller 400 includes three additional ITO voltage generators similar to 420 for individually adjusting ITO voltages applied to ITO sections 161-164.

In yet another embodiment, the distinct LC dark-state voltages can be hard-coded on LCoS chip 445 using known in the art approaches.

Figure 27:
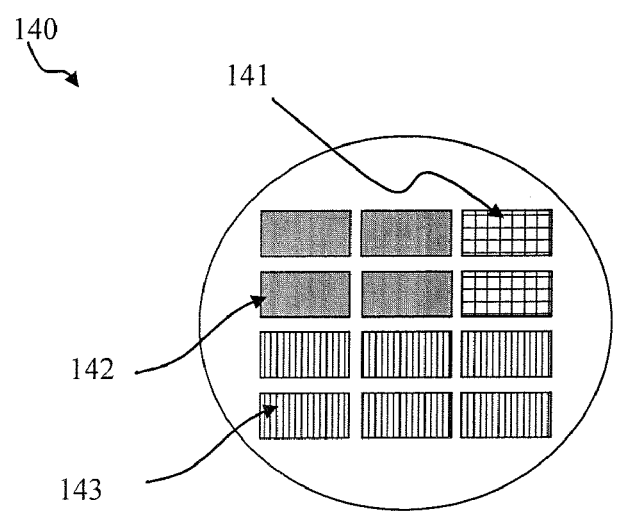
FIG. 27 is a diagram illustrating on-wafer contrast optimization.

FIG. 27 illustrate optimizing for overall contrast and contrast uniformity at the level of TR/LCoS wafer 140 for groups of LCoS dies. A fully assembled compensated LCoS wafer 140 is sectionalized into three regions, 141, 142 and 143, corresponding to the LCoS dark state driving requirements. These regions can be identified, e.g. by collecting information about differences in the LCoS cell gap definition, LC pre-tilt angle and/or the trim retarder wafer non-uniformity. By sweeping the required dark-state LCoS drive voltage, the entire array of LCoS devices can be electrically tuned to enhance system contrast and/or contrast uniformity from each compensated micro-display.

Although voltage tuning has been described as the second step contrast optimization, a pre-compensated TR/LCD panel assembly wherein the TR is oriented relative to the LCD panel so as to partially compensate for the residual LCD panel retardance can be further tuned-in by other non-mechanical means, so that further lessen the combined, or net polarization changing effect of the LCD panel and the TR on the pre-determined polarization state of the incident light beam.

Figure 28:
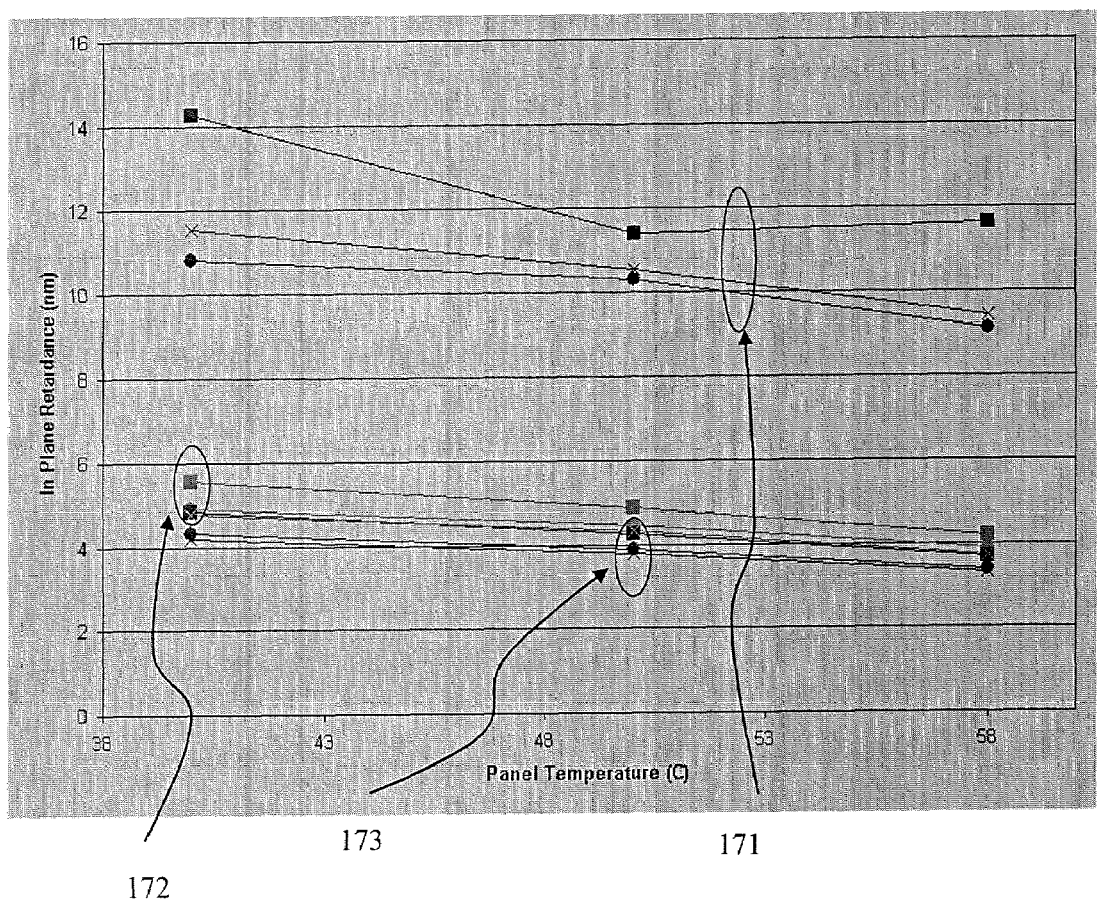
FIG. 28 is a graph illustrating temperature dependence of the residual IPR for three different LCD panels in RGB color bands.

For example, it is known in the art that the refractive indices and birefringence of the LC mixture in the LCD panel, and that used in the TR are temperature dependent. Hence, the temperature of either the LCD panel and/or the trim retarder can be varied such that the contrast of the system is optimized. FIG. 28 shows measurement results for the low-voltage IPR of several uncompensated LCD panels characterized with a polarimeter. The groups of red 171, green 172 and blue 173 band retardance profiles represent the panel retardance at approximately 1.5, 0.9 and 0.7V sub-threshold voltage driving, respectively. Accordingly, by controlling the LCoS panel temperature, e.g. using a TEC controller and a temperature detector as known in the art for other active optical devices, while driving the LCD panel at a pre-determined nominal dark-state voltage, the LCoS panel IPR can be adjusted so as lessen the net combined polarization changing effect of the LCD panel and the trim retarder on the pre-determined polarization state of the incident light beam. In this embodiment of the invention, a characterization procedure for the LCD panel assembly 22 similar to that described hereinabove with reference to FIGS. 21 and 22 can be used to determine the temperature operating point providing suitable contrast enhancement.

Furthermore, the aforedescribed electronic fine-tuning of the LCD panel assembly 22 can also be performed in operation, e.g. when the LCD panel assembly 22 is used in a device for displaying an image on a screen, such as the projector shown in FIG. 1. In this embodiment, the invention provides a method of electronic contrast adjustment of an image, that includes the steps of i) assessing a contrast of the image displayed by the device on the screen; and, ii) adjusting the voltage to enhance the contrast. The step of assessing the contrast of the image can comprise assessing the contrast at two different locations on the screen, and the step of adjusting can include individually adjusting voltages applied to at least two different cells of the LCD panel for improving spatial uniformity of the contrast, e.g. as described hereinabove with reference to FIG. 25.

Although the invention has been described hereinabove with reference to VAN LCoS panels, it is also applicable to other liquid crystal modes of operations, such as twisted-nematic etc; in all these systems, TR compensators having a wide range of A-plane retardance can be used to practice the invention. Further, it can also be applicable to the direct-view LCD panels, in which fabrication a large area compensator film is typically passively aligned to the screen thin-film-transistor (TFT) array. The invention can also be applicable to transmissive LC microdisplays. Further, the aforedescribed voltage and/or temperature tuning schemes are equally applicable to wire-grid, 3M Vikuiti, MacNeille and other PBS based reflective optical systems.

While the C-plate retardance in the compensating TR has not been described in detail herein, it is understood that a high performance TR requires a suitable amount of negative C-plate retardance to achieve a high contrast ratio in conjunction with a positive C-plate LCoS device. The C-plate retardance in the TR is thought to be sufficiently invariant with regard to mechanical in-plane clocking of TR orientations to allow for any suitable mechanical alignment of the TR and LCoS slow axes in the first contrast optimization step, before said electronic adjustment step is performed.

Of course numerous other embodiments may be envisioned without departing from the spirit and scope of the invention.

We claim:

1. A method of lessening unwanted effects from a residual in-plane retardance of a liquid crystal display (LCD) panel for an incident light beam having a pre-determined polarization, the method comprising the steps of:
   a) optically coupling a trim retarder with the LCD panel, the trim retarder having an in-plane retardance greater than the residual in-plane retardance of the LCD panel;
   b) orienting the trim retarder relative to the LCD panel in a fixed position so that a polarization-changing effect of the residual retardance of the LCD panel on the incident beam is at least partially compensated by a polarization-changing effect of the trim retarder; and,
   c) adjusting at least one of a voltage to the LCD panel, a temperature of the LCD panel and a temperature of the trim retarder, so as to lessen a combined polarization changing effect of the LCD panel and the trim retarder on the pre-determined polarization state of the incident light beam, to attain a dark-state operation condition of the LCD panel.

2. A method according to claim 1, wherein:
   step (b) comprises orienting the trim retarder relative to the LCD panel so as to over-compensate the residual in-plane retardance of the LCD panel for the incident light; and,
   step (c) comprises:
   d) applying the voltage to the LCD panel for changing the magnitude of the LCD panel in-plane retardance away from the residual in-plane retardance;
   e) adjusting the voltage to the LCD panel so as to substantially minimize the combined polarization changing effect of the LCD panel and the trim retarder on the pre-determined polarization state of the incident light beam; and,
   f) utilizing the adjusted voltage as a dark state voltage of the LCD panel.

3. A method according to claim 2, wherein the incident light beam is linearly polarized, and wherein the adjusted voltage is selected so as to align a net optical polarization axis of the LCD panel and the trim retarder along a polarization direction of the incident light beam, so as to offset the over-compensation of the residual in-plane retardance of the LCD panel by the trim retarder.

4. A method according to claim 2, wherein the LCD panel comprises an LC layer sandwiched between a transparent electrode and a pixelated electrode, and
   wherein step (e) comprises at least one of: adjusting a voltage at the transparent electrode, and adjusting a voltage at the pixelated electrode.

5. A method according to claim 4, further comprising the steps of:
   passing the incident light beam having the pre-determined polarization through the trim retarder and the LC layer of the LCD panel to obtain a dark state beam;
   passing the dark state beam to an analyzer to obtain a filtered dark-state beam;
   measuring the filtered dark-state beam to obtain a feedback signal; and,
   using the feedback signal to adjust the voltage applied to the LCD panel for minimizing the intensity of the filtered dark-state beam.

6. A method according to claim 5, wherein the step of measuring the filtered dark-state beam comprises performing spatially-resolved measurements for obtaining at least two feedback signals related to at least two different groupings of LC pixels of the LCD panel,
further comprising the step of individually adjusting voltages applied to said groupings of LC pixels for improving spatial uniformity of the dark state beam.

7. A method according to claim 6, wherein the step of individually adjusting voltages applied to said groupings of LC pixels includes the step of individually adjusting dark-state voltages for said groupings of LC pixels for enhancing a contrast ratio uniformity.

8. A method according to claim 6, wherein the step of individually adjusting voltages applied to said groupings of LC pixels includes the step of individually adjusting grey-level voltages or voltage waveforms for said groupings of LC pixels.

9. A method according to claim 8, further including the steps of obtaining and storing distinct gamma-correction tables for each of the groupings of LC pixels.

10. A method according to claim 2 wherein the LCD panel is used in a device for displaying an image on a screen, further comprising the steps of:
assessing a contrast of the image displayed by the device on the screen; and,
adjusting the voltage to enhance the contrast.

11. A method according to claim 7, wherein the step of assessing the contrast of the image comprises assessing the contrast at two different locations on the screen, and wherein the step of adjusting includes individually adjusting voltages applied to at least two different cells of the LCD panel for improving spatial uniformity of the contrast.

12. A method according to claim 2,
wherein the LCD panel comprises a liquid crystal on silicon (LCoS) microdisplay formed from a single die of a silicon backplane wafer, said silicon backplane wafer comprising a plurality of dies for forming a plurality of LCD panels, and
wherein steps (a) and (b) are performed by aligning a single trim retarder wafer covering the plurality of dies relative to the silicon backplane wafer in a pre-determined orientation, and by bonding the aligned trim retarder wafer to the silicon backplane wafer for forming a plurality of LCD panels.

13. An LCD panel assembly for modulating a light beam incident thereupon in a pre-determined linear polarization state, comprising:
an LCD panel having a residual in-plane retardance in a dark state; and
a retardance compensating element disposed in the path of the incident light beam,
wherein the retardance compensating element has an in-plane retardance that is greater than the residual in-plane retardance of the LCD panel
for over-compensating the residual in-plane retardance of the LCD panel for the light beam by at least 0.2 nm,
so as to induce a cross-polarization conversion of the light beam at the output of the LCD panel assembly that can be lessened by a voltage applied to the LCD panel.

14. An LCD panel assembly according to claim 13, wherein the retardance compensating element comprises a birefringent element disposed over a cover glass of the LCD panel.

15. An LCD panel assembly according to claim 13, wherein the LCD panel is transmissive.

16. An LCD panel assembly according to claim 13, wherein the LCD panel comprises a reflective silicon backplane.

17. An LCD panel assembly according to claim 16, wherein the LCD panel includes a VAN-mode Liquid Crystal layer.

18. An LCD panel assembly according to claim 16, wherein the LCD panel includes a TN-mode Liquid Crystal layer.

19. An LCD panel assembly for modulating a light beam incident thereupon in a pre-determined linear polarization state, comprising:
an LCD panel having a residual in-plane retardance in a dark state and comprising an array of LC pixels; and,
a retardance compensating element disposed in the path of the light beam for at least partially compensating the polarization-changing effect from the residual in-plane retardance of the LCD panel for the light beam;
wherein the LCD panel is sectionalized into a plurality of sections, each section comprising a spatial groupings of pixels, and wherein in operation each of said groupings of pixels is driven by a voltage waveform associated with a distinct dark-state voltage that is different from respective dark-state voltages for the other groupings of pixels, so as to improve spatial uniformity of a resulting image contrast in comparison with an image contrast resulting from using a same dark-state voltage for each of said groupings of pixels.

20. A method of LCD panel manufacturing, comprising the steps of:
providing a backplane wafer comprising a plurality of backplane wafer portions configured for forming a plurality of LCD panels each having a residual in-plane retardance;
providing a trim retarder wafer having an in-plane retardance greater than the residual in-plane retardance of each of the plurality of LCD panels;
disposing the trim retarder wafer over the backplane wafer with a gap therebetween for holding an LC layer;
bonding the trim retarder wafer to the backplane wafer in a fixed relative orientation for forming an LCD panel assembly array; and,
dicing the LCD panel assembly array into a plurality of individual LCD panel assemblies, each comprising an LCD panel integrated with a trim retarder;
wherein the fixed relative orientation of the trim retarder wafer and the backplane wafer is selected so as to over-compensate the residual in-plane retardance of at least a majority of the LCD panels for an incident beam having a pre-determined polarization state, to enable electronic contrast enhancement by adjusting dark state voltages for the at least the majority of the individual LCD panel assemblies.

* * * * *